United States Patent
Mathew et al.

(10) Patent No.: US 11,290,438 B2
(45) Date of Patent: Mar. 29, 2022

(54) MANAGING SESSION ACCESS ACROSS MULTIPLE DATA CENTERS

(71) Applicant: Oracle International Corporation, Redwood Shores, CA (US)

(72) Inventors: Stephen Mathew, Bangalore (IN); Vipin Koottayi, Kerala (IN)

(73) Assignee: Oracle International Corporation, Redwood Shores, CA (US)

(*) Notice: Subject to any disclaimer, the term of this patent is extended or adjusted under 35 U.S.C. 154(b) by 68 days.

(21) Appl. No.: 15/784,029

(22) Filed: Oct. 13, 2017

(65) Prior Publication Data

US 2019/0014102 A1 Jan. 10, 2019

Related U.S. Application Data

(60) Provisional application No. 62/530,008, filed on Jul. 7, 2017.

(51) Int. Cl.
*G06F 7/04* (2006.01)
*H04L 29/06* (2006.01)
(Continued)

(52) U.S. Cl.
CPC .......... *H04L 63/0815* (2013.01); *G06F 21/41* (2013.01); *H04L 67/14* (2013.01);
(Continued)

(58) Field of Classification Search
CPC ..... H04L 63/0815; H04L 67/14; H04L 63/10; G06F 21/41; G06F 2221/2117
See application file for complete search history.

(56) References Cited

U.S. PATENT DOCUMENTS 6,041,357 A 3/2000 Kunzelman et al.
6,055,637 A 4/2000 Hudson et al.
(Continued)

FOREIGN PATENT DOCUMENTS

EP 1864240 12/2007
WO 2013049461 4/2013
(Continued)

OTHER PUBLICATIONS

Configuring Vmware Identity Manager For Multiple Data Centers, Technical White Paper: VMware Identity Manager 2.8, Retrieved from internet Https://www.vmware.com/content/dam/digitalmarketing/vmware/en/pdf/techpaper/vmware-identity-manager-multiple-data-center-configuration.pdf, Dec. 2016, 16 pages.
(Continued)

*Primary Examiner* — Shewaye Gelagay
*Assistant Examiner* — Carlton Johnson
(74) *Attorney, Agent, or Firm* — Kilpatrick Townsend & Stockton LLP

(57) ABSTRACT

The disclosure relates to techniques for enforcing a limit on single sign-on (SSO) sessions for users across multiple data centers in a multi data center deployment. Users may request access to resources that are governed by an access manager deployed across multiple data centers, with each data center being associated with its own identifier. Each user may be associated with an identity attribute preserved in identity stores across the multiple data centers. The prerequisite for session creation at a data center may be to update the identity attribute of the user to that data center's identifier. If the identity attribute can be updated successfully, the access manager can create a new SSO session at that data center. Updates to the identity attribute may be synchronized across all of the data centers, with each data center aware of any
(Continued)

existing sessions based on the current value of the identity attribute.

10 Claims, 10 Drawing Sheets

(51) Int. Cl.
  *G06F 21/41* (2013.01)
  *H04L 67/14* (2022.01)
(52) U.S. Cl.
  CPC ...... *G06F 2221/2117* (2013.01); *H04L 63/10* (2013.01); *H04L 63/102* (2013.01)

(56) References Cited

U.S. PATENT DOCUMENTS

| | | |
|---|---|---|
| 6,076,108 A | 6/2000 | Courts et al. |
| 6,178,511 B1 | 1/2001 | Cohen et al. |
| 6,338,064 B1 | 1/2002 | Ault et al. |
| 6,385,724 B1 | 5/2002 | Beckman et al. |
| 6,430,619 B1 | 8/2002 | Sitaraman et al. |
| 6,609,198 B1 | 8/2003 | Wood et al. |
| 6,811,873 B2 | 11/2004 | Nadkarni |
| 7,100,195 B1 | 8/2006 | Underwood |
| 7,137,006 B1 | 11/2006 | Grandcolas et al. |
| 7,225,256 B2 | 5/2007 | Villavicencio |
| 7,296,290 B2 | 11/2007 | Barriga et al. |
| 7,426,642 B2 | 9/2008 | Aupperle et al. |
| 7,437,594 B1 | 10/2008 | Mount et al. |
| 7,496,953 B2 | 2/2009 | Andreev et al. |
| 7,525,938 B2 | 4/2009 | Hurtta |
| 7,747,746 B2 | 6/2010 | Thayer et al. |
| 7,761,911 B2 | 7/2010 | Song |
| 7,805,529 B2 | 9/2010 | Galluzzo et al. |
| 7,805,757 B2 | 9/2010 | Menten |
| 7,818,582 B2 | 10/2010 | Marion et al. |
| 7,886,000 B1 | 2/2011 | Polis et al. |
| 7,908,380 B1 | 3/2011 | Chu et al. |
| 7,996,376 B2 | 8/2011 | Singh et al. |
| 8,001,232 B1 | 8/2011 | Saulpaugh et al. |
| 8,073,954 B1 | 12/2011 | Tu et al. |
| 8,117,649 B2 | 2/2012 | Hardt |
| 8,244,907 B2 | 8/2012 | Hinton et al. |
| 8,365,266 B2 | 1/2013 | Bogner |
| 8,438,635 B2 | 5/2013 | Das et al. |
| 8,442,943 B2 | 5/2013 | Multer et al. |
| 8,468,586 B2 | 6/2013 | Koottayi et al. |
| 8,495,195 B1 | 7/2013 | Abidogun et al. |
| 8,544,069 B1 | 9/2013 | Subbiah et al. |
| 8,611,873 B2 | 12/2013 | Onyon et al. |
| 8,627,435 B2 | 1/2014 | Sirota |
| 8,627,479 B2 | 1/2014 | Wittenstein et al. |
| 8,650,305 B2 | 2/2014 | Booth et al. |
| 8,719,342 B2 | 5/2014 | Mutikainen et al. |
| 8,738,774 B2 | 5/2014 | Ryner et al. |
| 8,756,704 B2 | 6/2014 | Castellucci et al. |
| 8,819,444 B2 | 8/2014 | Shahbazi et al. |
| 8,843,997 B1 | 9/2014 | Hare |
| 8,898,765 B2 | 11/2014 | Goyal et al. |
| 8,955,037 B2 | 2/2015 | Srinivasan et al. |
| 8,990,909 B2 | 3/2015 | Kelley |
| 9,083,690 B2 | 7/2015 | Subramanya et al. |
| 9,104,451 B2 | 8/2015 | Subramanya et al. |
| 9,124,582 B2 | 9/2015 | Kalinichenko et al. |
| 9,225,744 B1 | 12/2015 | Behm et al. |
| 9,230,003 B2 | 1/2016 | Goetsch |
| 9,240,886 B1 | 1/2016 | Allen et al. |
| 9,247,006 B2 | 1/2016 | Mathew et al. |
| 9,405,887 B2 | 8/2016 | Xia et al. |
| 9,509,684 B1 | 11/2016 | Dixson-Boles et al. |
| 9,544,293 B2 | 1/2017 | Mathew et al. |
| 9,769,147 B2 | 9/2017 | Mathew et al. |
| 9,866,640 B2 | 1/2018 | Motukuru et al. |
| 9,887,981 B2 | 2/2018 | Mathew et al. |
| 10,009,335 B2 | 6/2018 | Mathew et al. |
| 10,084,769 B2 | 9/2018 | Mathew et al. |
| 10,157,275 B1 | 12/2018 | Venkatasamy et al. |
| 10,454,936 B2 | 10/2019 | Koottayi et al. |
| 10,572,649 B2 | 2/2020 | Mathew et al. |
| 10,581,826 B2 | 3/2020 | Kukehalli Subramanya et al. |
| 10,623,501 B2 | 4/2020 | Matthew et al. |
| 10,693,859 B2 | 6/2020 | Ramya et al. |
| 10,693,864 B2 | 6/2020 | Stephen et al. |
| 2002/0029269 A1 | 3/2002 | McCarty et al. |
| 2002/0078365 A1 | 6/2002 | Burnett et al. |
| 2003/0105862 A1 | 6/2003 | Villavicencio |
| 2003/0212887 A1 | 11/2003 | Walther et al. |
| 2004/0003259 A1 | 1/2004 | Chang |
| 2004/0073666 A1 | 4/2004 | Foster et al. |
| 2005/0091655 A1 | 4/2005 | Probert et al. |
| 2005/0108570 A1 | 5/2005 | Gopalraj |
| 2005/0120091 A1 | 6/2005 | Casais et al. |
| 2005/0144482 A1 | 6/2005 | Anuszewski |
| 2006/0059546 A1 | 3/2006 | Nester et al. |
| 2006/0218630 A1 | 9/2006 | Pearson et al. |
| 2006/0236382 A1 | 10/2006 | Hinton et al. |
| 2006/0277596 A1 | 12/2006 | Calvert et al. |
| 2007/0089167 A1 | 4/2007 | Villavicencio |
| 2007/0147247 A1 | 6/2007 | Kalonji et al. |
| 2007/0192326 A1 | 8/2007 | Angal et al. |
| 2007/0220154 A1 | 9/2007 | El Husseini et al. |
| 2008/0066159 A1 | 3/2008 | Dillaway et al. |
| 2008/0113791 A1 | 5/2008 | Williams et al. |
| 2008/0114883 A1 | 5/2008 | Singh et al. |
| 2008/0294781 A1 | 11/2008 | Hinton et al. |
| 2009/0037581 A1 | 2/2009 | Richardson et al. |
| 2009/0037763 A1 | 2/2009 | Adhya et al. |
| 2009/0047928 A1 | 2/2009 | Utsch et al. |
| 2009/0089437 A1 | 4/2009 | Polozoff |
| 2009/0132639 A1 | 5/2009 | Yan |
| 2009/0216587 A1* | 8/2009 | Dwivedi .................. H04L 67/18 705/7.12 |
| 2009/0292927 A1 | 11/2009 | Wenzel et al. |
| 2010/0043062 A1 | 2/2010 | Alexander et al. |
| 2010/0082989 A1 | 4/2010 | Bussard et al. |
| 2010/0131755 A1 | 5/2010 | Zhu et al. |
| 2010/0146611 A1 | 6/2010 | Kuzin et al. |
| 2010/0154043 A1 | 6/2010 | Castellucci et al. |
| 2010/0290392 A1 | 11/2010 | Rasanen et al. |
| 2011/0010542 A1 | 1/2011 | Choi et al. |
| 2011/0154443 A1 | 6/2011 | Thakur et al. |
| 2011/0173643 A1 | 7/2011 | Nicolson et al. |
| 2011/0185421 A1 | 7/2011 | Wittenstein et al. |
| 2011/0307615 A1 | 12/2011 | Krishnaswamy et al. |
| 2012/0078708 A1 | 3/2012 | Taylor et al. |
| 2012/0106333 A1 | 5/2012 | Lee et al. |
| 2012/0191842 A1 | 7/2012 | Hu et al. |
| 2012/0254949 A1 | 10/2012 | Mikkonen et al. |
| 2012/0254957 A1 | 10/2012 | Fork et al. |
| 2012/0266229 A1 | 10/2012 | Simone et al. |
| 2012/0291090 A1 | 11/2012 | Srinivasan et al. |
| 2013/0036454 A1 | 2/2013 | Purvis et al. |
| 2013/0073670 A1 | 3/2013 | Das et al. |
| 2013/0086651 A1 | 4/2013 | Kavantzas et al. |
| 2013/0086652 A1 | 4/2013 | Kavantzas et al. |
| 2013/0198818 A1 | 8/2013 | Hitchcock et al. |
| 2014/0025939 A1 | 1/2014 | Smith et al. |
| 2014/0068702 A1 | 3/2014 | Hyndman et al. |
| 2014/0149280 A1 | 5/2014 | Karkhanis et al. |
| 2014/0282961 A1 | 9/2014 | Dorfman et al. |
| 2014/0304773 A1 | 10/2014 | Woods et al. |
| 2014/0344326 A1 | 11/2014 | Kamath et al. |
| 2015/0074407 A1 | 3/2015 | Palmeri et al. |
| 2015/0082029 A1 | 3/2015 | Volchok |
| 2015/0088978 A1 | 3/2015 | Motukuru et al. |
| 2015/0089569 A1 | 3/2015 | Sondhi et al. |
| 2015/0089570 A1 | 3/2015 | Sondhi et al. |
| 2015/0089571 A1 | 3/2015 | Srinivasan et al. |
| 2015/0089579 A1 | 3/2015 | Manza et al. |
| 2015/0089580 A1 | 3/2015 | Manza et al. |
| 2015/0089596 A1 | 3/2015 | Sondhi et al. |
| 2015/0089597 A1 | 3/2015 | Srinivasan et al. |
| 2015/0089604 A1 | 3/2015 | Mathew et al. |

(56) References Cited

U.S. PATENT DOCUMENTS

| | | | |
|---|---|---|---|
| 2015/0089614 A1* | 3/2015 | Mathew | H04L 65/1069 726/7 |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 | 5/2015 | Eguchi | |
| 2015/0220713 A1 | 8/2015 | Beenau et al. | |
| 2015/0220926 A1 | 8/2015 | McLachlan et al. | |
| 2016/0028737 A1 | 1/2016 | Srinivasan et al. | |
| 2016/0065570 A1 | 3/2016 | Spencer, III et al. | |
| 2016/0219040 A1 | 7/2016 | Mathew et al. | |
| 2016/0232516 A1 | 8/2016 | Dayan et al. | |
| 2016/0248758 A1 | 8/2016 | Mathew et al. | |
| 2016/0285822 A1 | 9/2016 | Adams | |
| 2016/0380941 A1 | 12/2016 | Tanurdjaja et al. | |
| 2016/0381000 A1 | 12/2016 | Mathew et al. | |
| 2017/0034152 A1 | 2/2017 | Subramanya et al. | |
| 2017/0041296 A1 | 2/2017 | Ford et al. | |
| 2017/0085556 A1 | 3/2017 | Mathew et al. | |
| 2017/0118218 A1 | 4/2017 | Koottayi et al. | |
| 2017/0118222 A1 | 4/2017 | Subramanya et al. | |
| 2017/0118249 A1 | 4/2017 | Motukuru et al. | |
| 2017/0126689 A1 | 5/2017 | Lloyd et al. | |
| 2017/0201524 A1 | 7/2017 | Dureau | |
| 2018/0046794 A1 | 2/2018 | Mathew et al. | |
| 2018/0077243 A1 | 3/2018 | Mathew et al. | |
| 2018/0157825 A1 | 6/2018 | Eksten et al. | |
| 2018/0191701 A1 | 7/2018 | Kong et al. | |

FOREIGN PATENT DOCUMENTS

| | | |
|---|---|---|
| WO | 2015042546 | 3/2015 |
| WO | 2015042547 | 3/2015 |
| WO | 2016051240 | 4/2016 |

OTHER PUBLICATIONS

Multi-Data Center With Session Sharing IBM Security Access Manager for Web, Version 7.0, Retrieved from internet:https://www.ibm.com/support/knowledgecenter/SSPREK_7.0.0/com.IBM.isam.doc_70/ameb_smsdeploy_guide/concept/c_multi_data_center_with_session.html, 2017, 3 pages.

The ABCs of ADCs, White Paper: ABCs of Application Delivery, Retrieved from Internet: https://www.fortinet.com/content/dam/fortinet/assets/white-papers/FortiADC-ABCs.pdf, 2014, 8 pages.

U.S. Appl. No. 15/143,240, Notice of Allowance dated May 24, 2018, 15 pages.

U.S. Appl. No. 14/814,209, Non-Final Office Action dated May 14, 2018, 20 pages.

U.S. Appl. No. 15/782,700, Notice of Allowance dated Aug. 8, 2018, 25 pages.

U.S. Appl. No. 15/707,261, Non-Final Office Action dated Sep. 13, 2018, 10 pages.

BIG-IP Access Policy Manager, http://www.f5.com/pdf/products/big-ip-access-policy-manager-ds.pdf, 2013, 13 pages.

Developing an Application to Manage Impersonation, Fusion Middleware, Developer's Guide for Oracle Access Management, Nov. 2012, 10 pages.

Dual Factor Authentication Reliance, Oct. 24, 2016, 8 pages.

IBM Security Access Manager for Enterprise Single Sign-On, Available online at: http://www-03.ibm.com/software/products/en/access-mgr-esso, Nov. 10, 2016, 2 pages.

IBM Security Access Manager for Enterprise Single Sign-On, Retrieved from the Internet: <URL: http:I/onwireco.com/wp-content/uploads/2013/12/IBM_Security_Access_Manager_For_Enterprise_Single_Sign-On.pdf, 2013, 8 pages.

Impersonate another user: Dynamics CRM 2015, Retrieved from the Internet: https://msdn.microsoft.com/en-us/library/gg334744.aspx, 2015, 1 page.

Implementing Single Sign-On Across Multiple Organizations, Developer.force.com, http://wiki.developerforce.com/page/Implementing_Single_Sign-On_Across_Multiple_Organizations, Dec. 19, 2013, 8 pages.

Installing VCenter Single Sign-On in a multisite deployment, Retrieved from the Internet:http://kb.vmware.com/selfservice/microsites/search.do語anguage=en_US&cmd=displayKC&externalId=2034074, 2014, 2 pages.

Multiple Data Centers, Retrieved from the Internet: <URL: https://support.ca.com/cadocs/0/CA%20SiteMinder%2012%2052%20SP1-ENU/Bookshelf_Files/HTMUidocs/index.htmtoc.htm706393.htmlintcmp=searchresultclick&resultnum=452, 2014, 8 pages.

Oracle Enterprise Single Sign-On Suite Plus 11gR2 PS2, Retrieved from the Internet:http://www.oracle.com/technetworklmiddleware/id-mgmt/essosuite-technical-whitepaper-1519077.pdf, 2014, 25 pages.

Oracle Fusion Middleware Developer's Guide for Oracle Access Management, Retrieved from the Internet: <URL: https://docs.oracle.com/cd/E52734_01/oam/AIDEVIimpersonation.html DEV422, 2015, 11 pages.

Oracle Fusion Middleware Developing Web Applications, Using Sessions and Session Persistence, Retrieved from the Internet <URL:http://docs.oracle.com/cd/E12839_01/web.1111/e13712/sessions.htm#WBAPP301, May 2009, 6 pages.

Oracle Fusion Middleware Performance and Tuning for Oracle Weblogic Server, Retrieved from the Internet: <URL: http://docs.oracle.com/cd/E12839_01/web.1111/e13814/webapptune.htm#PERFM368, 2015, 3 pages.

RSA Adaptive Authentication, RSA, 2016, 4 pages.

Symantec Identity: Access Manager, Retrieved from the Internet :< URL: http://www.symantec.com/contenUen/US/enterprise/fact_sheets/bsymantec_identity_access_manager_DS_2122784, 2014, 2 pages.

The art of logging out, Available online at: https://www.kth.se/social/group/cas/page/the-art-of-logging-out, Apr. 26, 2013, 2 pages.

User Session Monitoring for CA Single Sign-On, Available online at:https://www.ca.com/content/dam/ca/us/files/service-offering/user-session-monitor-for-ca-single-sign-on.pdf, 2015, 1 page.

U.S. Appl. No. 14/135,053, Final Office Action dated Jul. 6, 2015, 17 pages.

U.S. Appl. No. 14/135,053, Non-Final Office Action dated Jan. 29, 2015, 16 pages.

U.S. Appl. No. 14/135,053, Non-Final Office Action dated Nov. 25, 2015, 18 pages.

U.S. Appl. No. 14/135,053, Notice of Allowance dated May 20, 2016, 10 pages.

U.S. Appl. No. 14/135,053, Notice of Allowance dated Aug. 31, 2016, 9 pages.

U.S. Appl. No. 14/137,775, Non-Final Office Action dated May 22, 2015, 10 pages.

U.S. Appl. No. 14/137,775, Notice of Allowance dated Sep. 16, 2015, 9 pages.

U.S. Appl. No. 14/491,076, Final Office Action dated Oct. 25, 2016, 19 pages.

U.S. Appl. No. 14/491,076, Final Office Action dated Oct. 6, 2016, 19 pages.

U.S. Appl. No. 14/491,076, Non-Final Office Action dated Mar. 11, 2016, 13 pages.

U.S. Appl. No. 14/491,076, Notice of Allowance dated Nov. 2, 2017, 11 pages.

U.S. Appl. No. 14/754,222, Non-Final Office Action dated Dec. 1, 2016, 10 pages.

U.S. Appl. No. 14/754,222, Notice of Allowance dated May 17, 2017, 5 pages.

U.S. Appl. No. 14/814,209, Final Office Action dated Jul. 31, 2017, 19 pages.

U.S. Appl. No. 14/814,209, Non-Final Office Action dated Jan. 11, 2017, 13 pages.

U.S. Appl. No. 15/005,365, Final Office Action dated Mar. 10, 2017, 12 pages.

U.S. Appl. No. 15/005,365, Non-Final Office Action dated Aug. 24, 2016, 11 pages.

U.S. Appl. No. 15/005,365, Notice of Allowance dated Sep. 27, 2017, 16 pages.

(56) References Cited

OTHER PUBLICATIONS

U.S. Appl. No. 15/143,240, Final Office Action dated Dec. 15, 2017, 14 pages.
U.S. Appl. No. 15/143,240, Non-Final Office Action dated Jun. 5, 2017, 11 pages.
U.S. Appl. No. 15/372,342, Non-Final Office Action dated Oct. 20, 2017, 14 pages.
U.S. Appl. No. 15/372,342, Notice of Allowance dated Mar. 13, 2018, 12 pages.
U.S. Appl. No. 15/782,700, Non-Final Office Action dated Jan. 26, 2018, 7 pages.
U.S. Appl. No. 61/880,335, filed Sep. 20, 2013.
U.S. Appl. No. 61/880,400, filed Sep. 20, 2013.
U.S. Appl. No. 61/880,569, filed Sep. 20, 2013.
U.S. Appl. No. 61/880,598, filed Sep. 20, 2013.
Dacosta et al., One-Time Cookies: Preventing Session Hijacking Attacks with Stateless Authentication Tokens, ACM Trans. Internet Technol. 12, 1, Article 1, 2012, 31 pages.
Ferguson et al., Session management server: Session transitions and state, Retrieved from the Internet: http://www.ibm.com/developerworks/tivoli/library/t-sms-states/, Jun. 25, 2007, 7 pages.
Gaur, IBM Extreme Transaction Processing (XTP) Patterns: Scalable and robust HTTP session management with WebSphere eXtreme Scale, Retrieved from the Internet: http://www.ibm.com/developerworks/websphere/library/techarticles/0905_gaur/0905_gaur.html, May 27, 2009, 8 pages.
Haire, A Solution to SSO Authentication and Identity Management: Lessons Learned, Atlassian Blog, May 16, 2013, 5 pages.
Jive Software, Understanding Jive Mobile's SSO Compliance, Available online at: https://community.jivesoftware.com/docs/DOC-61829, Jun. 25, 2012, 11 pages.
Mortimore et al., Implementing Single Sign-On Across Multiple Organizations, Retrieved from the Internet: https://developer.salesforce.com/page!Implementing_Single_Sign-On_Across_Multiple_Organizations, 2000-2014, 15 pages.
Murdoch, Hardened Stateless Session Cookies, In International Workshop on Security Protocols, Springer Berlin Heidelberg, Apr. 2008, pp. 1-9.
Nagalakshmi et al., Confident Multi-Factor Authentication on Web Application Via Captcha Technologies, International Journal of Computer Engineering in Research Trends, vol. 2, Issue. 8, Aug. 2015, pp. 516-522.
Pujolle et al., Secure Session Management With Cookies, 7th International Conference on Information, Communications and Signal Processing (ICICS), 2009, pp. 1-6.
Rivard, Clearing Novell Access Manager Application Sessions, Retrieved from the Internet: <URL: https://www.netiq.com/communities/cool-solutions/clearing-novell-access-managerapplication-sessions/, Jan. 26, 2009, 4 pages.
Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.
Stirpe et al., Time-out Management in Multi-domain Single Sign-On, retrieved from the Internet: <URL: http://www.strattagroup.com/tsg/pubs/ssotime-out.pdf, 2005, 13 pages.
Volodarsky et al., Fast, Scalable, and Secure Session State Management for Your Web Applications, Retrieved from the Internet: <URL: https://msdn.microsoft.com/enus/magazine/cc163730.aspx, 2015, 9 pages.
Ye, A complete Impersonation Demo in C#.NET, Retrieved from the Internet: <URL: http://www.codeproject.com/Articles/12581 0/A-complete-impersonation-Demo-in-Csharp-NET, Jun. 20, 2013, 12 pages.
U.S. Appl. No. 14/814,209, Non-Final Office Action dated Aug. 19, 2019, 20 pages.
U.S. Appl. No. 15/331,613, Notice of Allowance dated Aug. 21, 2019, 12 pages.
U.S. Appl. No. 16/140,343, Non-Final Office Action dated Aug. 7, 2019, 11 pages.
Izumi et al., Toward Practical Use of Virtual Smartphone, IEEE 9th Asia-Pacific Symposium on Information and Telecommunication Technologies (APSITT), Dec. 12, 2012, pp. 1-5.
Menasce et al., Resource Management Policies for E-commerce Servers, ACM Sigmetrics Performance Evaluation Review, vol. 27, No. 4, Mar. 2000, pp. 27-35.
U.S. Appl. No. 15/291,804 Notice of Allowance dated Oct. 22, 2019, 12 pages.
U.S. Appl. No. 15/356,384 Notice of Allowance dated Oct. 30, 2019, 8 pages.
U.S. Appl. No. 15/707,261 Notice of Allowance dated Oct. 11, 2019, 5 pages.
U.S. Appl. No. 15/987,631 Final Office Action dated Sep. 16, 2020, 14 pages.
U.S. Appl. No. 14/814,209, Notice of Allowance dated Feb. 25, 2020, 9 pages.
U.S. Appl. No. 15/987,631, Non-Final Office Action dated Mar. 3, 2020, 12 pages.
U.S. Appl. No. 16/140,343, Notice of Allowance dated Feb. 7, 2020, 8 pages.
U.S. Appl. No. 15/987,631, Notice of Allowance dated Apr. 30, 2021, 11 pages.
Heo et al., "Statistical SIP Traffic Modeling and Analysis System", IEEE, 2010, pp. 1223-1228.
Maruyama et al., "Dynamic Route Selection Algorithms for Session Based Communication Networks", ACM, 1983, pp. 162-169.
U.S. Appl. No. 14/814,209, Final Office Action dated Jan. 4, 2019, 21 pages.
U.S. Appl. No. 15/291,804, First Action Interview Pilot Program Pre-Interview Communication dated Jan. 11, 2019, 4 pages.
U.S. Appl. No. 15/291,804, First Action Interview Office Action Summary dated Jun. 17, 2019, 5 pages.
U.S. Appl. No. 15/331,613, First Action Interview Office Action Summary dated May 29, 2019, 7 pages.
U.S. Appl. No. 15/331,613, First Action Interview Pilot Program PreInterview Communication dated Jan. 4, 2019, 5 pages.
U.S. Appl. No. 15/331,613, Notice of Allowance dated Jul. 9, 2019, 19 pages.
U.S. Appl. No. 15/707,261, Final Office Action dated Mar. 8, 2019, 6 pages.
U.S. Appl. No. 15/707,261, Notice of Allowance dated Jun. 27, 2019, 5 pages.
U.S. Appl. No. 15/15/356,384, Notice of Allowance dated Jun. 12, 2019, 9 pages.
U.S. Appl. No. 15/356,384, First Action Interview Pilot Program PreInterview Communication dated Feb. 8, 2019, 5 pages.

\* cited by examiner

MANAGING SESSION ACCESS ACROSS MULTIPLE DATA CENTERS

CROSS-REFERENCES TO RELATED APPLICATIONS

This application claims the benefit of and the priority to U.S. Provisional Application No. 62/530,008, filed on Jul. 7, 2017, titled "MANAGING SESSION ACCESS ACROSS MULTIPLE DATA CENTERS", and hereby incorporated by reference in its entirety for all purposes.

BACKGROUND

Generally, the present application relates to data processing. More specifically, the application is related to techniques for enforcing a global, single session limit for a user across multiple data centers in different locations.

Modern businesses rely on a variety of applications and systems that control and generate information that is critical to business operations. Different applications often provide different services and information, and different users may require access to different levels of information within each system or application.

Earlier, less-sophisticated applications incorporated access management logic directly into the application code. That is to say, each application would require users to have a separate account, separate policy logic, and separate permissions. Furthermore, when a user is authenticated by one of these applications (e.g., a first application), this authentication remains unknown to other applications in the enterprise because the fact that authentication with the first application has taken place is not shared. Thus, there is no concept of trust between applications using different systems for authentication and access control.

To remedy this, authentication and access control can be more efficiently implemented and managed as a shared resource, known as an access management system. Access management systems often use policies and other business logic to make a determination regarding whether a particular access request should be granted to a particular resource. Upon making a determination that access should be granted, a token is provided to a client (e.g., client application at a device) of the requestor. This token is like a key that can be used to open a door that guards restricted data (e.g., a secure resource).

For example, a user may attempt to access a human resources database to gather information about certain employees such as salary information. The user's web browser at a client generates a request to access the database, which requires authentication. If the web browser does not have a token, the user is asked to log in to the access management system. When the user is authenticated, the user's browser at the client receives a token that may be used to access the human resources application.

In an enterprise, users typically may have access to one or more different systems and applications. Each of these systems and applications may utilize different access control policies and require different credentials (e.g., user names and passwords). A user wanting to access multiple resources protected by an access management system may need to be authenticated through user credentials provided to the access management system. A successful authentication gives the user authorization to access the protected resources, based on their assigned access privileges. Upon authentication of the user, the access management system may establish a session ("user session") to provide the access granted to the protected resource(s). For a user session, the access management system may maintain session information at a computing system (e.g., server computer) for the user session. The session information maintained by access management system may be referred to as a server-side session. The access management system may store session information for the server-side session that defines the access granted to the user and the constraints of the session. The session information for a server-side session may be mapped to a client which is provided with a token.

If a user wants to access multiple resources protected by the access management system, the access management system may determine whether the user is authenticated to access the multiple resources requested by a user. In some instances, authentication of a user for one resource may suffice for accessing other resources, otherwise the access management system may request additional credentials from the user. In other instances, upon authentication to access multiple resources, the user may not need to re-authenticate to access additional resources. In such instances, the access management system may establish and maintain a single session for the user, such as a single sign-on session (SSO), that provides a user with access to multiple resources after authentication. In the instance where a SSO session is established, the access management system enforces access for the SSO based on the token.

In many cases, enterprise computer networks (e.g., for implementing the access management system) are spread over different data centers that are geographically collocated or dispersed, but belong to the same multi data center deployment. For redundancy and load balancing purposes, each of the data centers of the multiple data centers may be running an instance of the access management system, and a client's request may be handled by a single instance of the access management system being run on a data center (e.g., for instance, the geographically nearest data center to the client). Using single sign-on (SSO), a user can log into one data center and then access other data centers without logging in. For example, SSO allows a user to enter a username/password once in order to gain access to protected resources stored across the multiple data centers.

As a security requirement, many organizations restrict the maximum concurrent SSO sessions per user to one, which means at any given point in time a valid user can have only single SSO session. However, this policy may be difficult to enforce when the access management system is deployed across multiple data centers. In particular, each data center of the multiple data centers will be capable of servicing user access requests, and thus each data center may have the capability to create a SSO session for a user. If the appropriate care is not taken, this can result in the creation of multiple SSO sessions associated with a given user. For example, the user could submit an access request to one data center and be granted a SSO session by that data center, while at the same time the user could submit another access request to another data center and receive a second SSO session.

One way of implementing max session enforcement is by restricting the user's authentication requests to a single data center based on geographic affinity. For example, if the user is located in California and sends an access request to to a local data center, that data center can ignore other access requests coming from California that are associated with the user. However, users can bypass restrictions based on geographic affinity by accessing the protected resources from devices across multiple geography, or a set of malicious users can access the resources from multiple geographic locations by sharing the same valid user ID. For example, one person could create a SSO session at a first data center using a set of user credentials, while at the same time, another person could create another SSO session at a different data center using the same set of user credentials. The resulting single session contract violation may cause security threats for any downstream applications which depend on the access manager for enforcing a single SSO session contract.

BRIEF SUMMARY

The present application relates to authentication. More specifically, the application is related to techniques for enforcing a maximum limit on single sign-on (SSO) sessions for each user across multiple data centers in a multi data center deployment. For example, a user may be restricted to one SSO session when accessing resources stored across multiple data centers in different locations, such that no other SSO sessions can be established for the user while the initial SSO session is active.

In some embodiments, there may be an access manager deployed across multiple data centers. In some embodiments, a limit on SSO sessions is enforced across the multiple data centers by having each data center store session information and security data associated with each user, and all of that data can be synchronized across the data centers. In some embodiments, each data center may store security data for each user that includes an identity attribute associated with each user. In particular, each user may be associated with their own identity attribute, 'lockedBy', which serves the role of a session lock across the multiple data centers by dictating whether an access request can be serviced to create a brand new SSO session.

In some embodiments, each data center of the multiple data centers may be associated with its own identifier (e.g., a data center identifier), such as a ClusterID. In some embodiments, these data center identifiers may be used as values for the 'lockedBy' identity attribute that is associated with each user and preserved in identity stores across the multiple data centers. The identity stores across the data centers may be in sync, with the specific 'lockedBy' attribute excluded from any replication rules associated with the identity stores, such that the original values for the 'lockedBy' attribute set by each data center will be preserved.

In some embodiments, the prerequisite for session creation at a data center may be to update the 'lockedBy' attribute of the user (preserved in the current data center's identity store) to the current data center's ClusterID in order to acquire the lock. If the lockedBy attribute in the identity store can be updated successfully to the current data center's ClusterID (e.g., the lockedBy attribute has no value or the value is already equivalent to the current data center's ClusterID), it means that the access manager can proceed to create a new SSO Session in that specific data center. In some embodiments, updating the 'lockedBy' attribute associated with a user may entail a synchronous call to all the participating data centers of the multiple data centers, such that the 'lockedBy' attribute for the user is updated at all of the identity stores with the current data center's ClusterID. However, in some cases the lockedBy attribute in the identity store will not be modifiable (e.g., it has a value that does not match the ClusterID of the current data center servicing the user's access request), which means that lock cannot be acquired and the session creation request will be rejected in order to enforce the single session per user constraint. Since the 'lockedBy' attribute for each user will be synchronized across the multiple data centers, the single session per user constraint is effectively evaluated across all of the data centers prior to the creation of any new SSO sessions.

As an example, a user may issue a first access request to a first data center of the multiple data centers. This access request is evaluated by the access manager and authenticated using the appropriate authentication scheme. Upon validating the user credentials from the access request, the access manager will check the identity store for the first data center to determine the 'lockedBy' attribute for the user. If the 'lockedBy' attribute is empty or equal to the ClusterID of the first data center, the 'lockedBy' attribute for the user will be updated with the ClusterID of the first data center and the access manager will create a new SSO session for the user at the first data center. In some embodiments, the 'lockedBy' attribute for the user will be updated with the ClusterID of the first data center prior to the creation of a SSO session for the user at the first data center. In other embodiments, the SSO session for the user at the first data center will be created prior to (or at the same time as) the 'lockedBy' attribute for the user being updated with the ClusterID of the first data center. As part of the synchronization process, the updated 'lockedBy' attribute for the user will be pushed out to other data centers in the multi data center deployment in order to update all of the identity stores.

Continuing the example, assume that at a later time, a second user issues a second access request to a second data center of the multiple data centers. However, this second access request involves the user credentials for the original user (e.g., that were used in the first access request). Upon validating the user credentials from this second access request, the access manager will check the identity store for the second data center to determine the 'lockedBy' attribute associated with the original user (since the original user's credentials were used). If the original user has an existing SSO session (e.g., established at the first data center), then the 'lockedBy' attribute at the identity store of the second data center will be equal to the ClusterID of the first data center. This means that the lock cannot be acquired and the second user's access request will be rejected in order to enforce the single session per user constraint. As a result, the single max session policy is enforced across the multiple data centers and geographic affinity violations are avoided (e.g., the second user is unable to start another session even if the second user is geographically located far away from the original user and using a different data center).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The foregoing, together with other features and embodiments, will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

Figure 1:
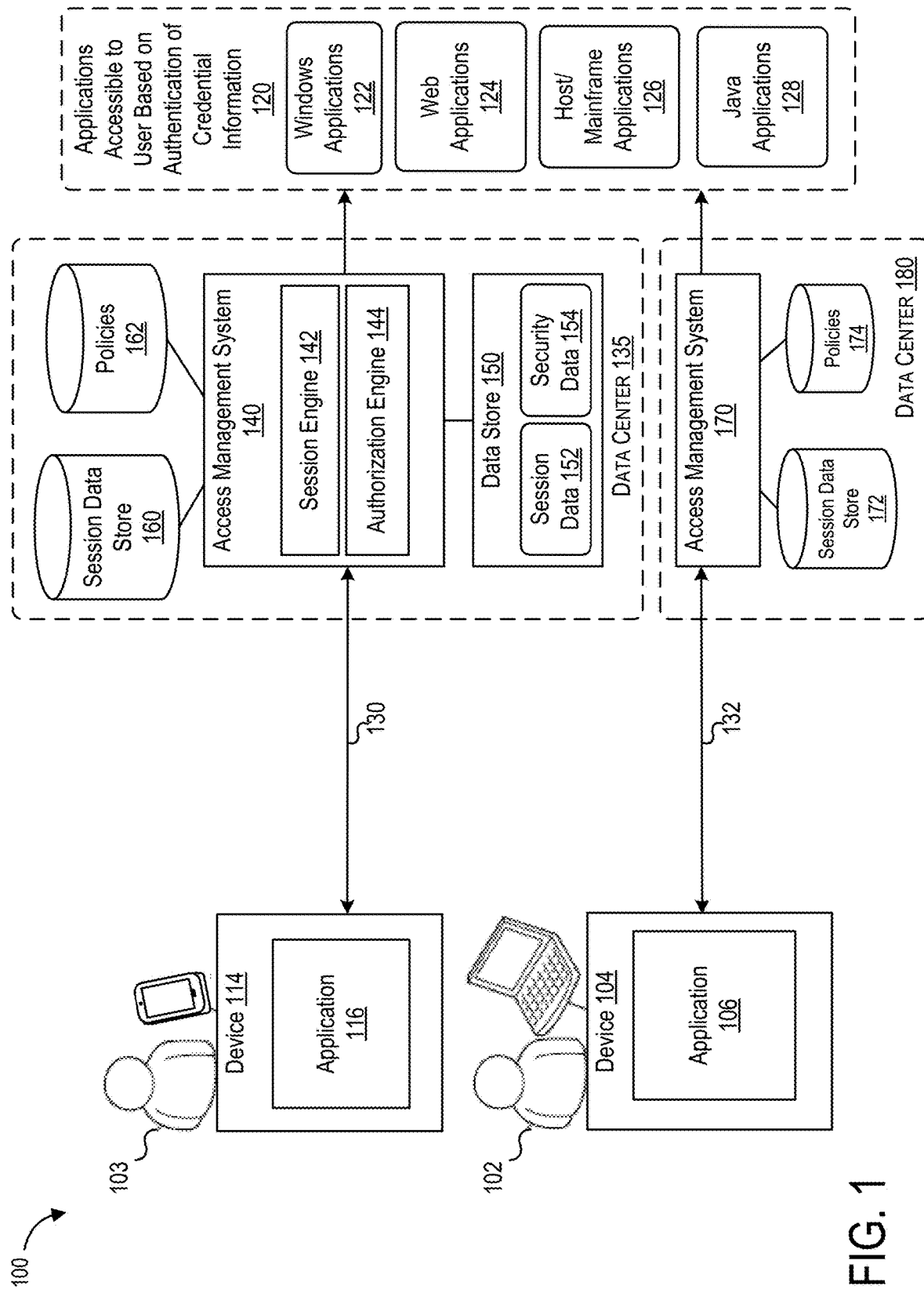
FIG. 1 illustrates a high-level diagram of a system for enforcing a single user session across multiple data centers, in accordance with an embodiment of the present disclosure.

In the following description, for the purposes of explanation, specific details are set forth in order to provide a thorough understanding of embodiments of the disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the present disclosure as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Enterprise computer networks may be used to meet the computing needs of one or more organizations, such as businesses, universities, government organizations, or the like. The enterprise computer network infrastructure may be spread over different data centers that may be dispersed over different geographic locations. Various resources included within an enterprise computer network may be managed and/or stored by the different data centers. For example, a first resource may be stored and managed by a first data center and a second resource may be stored and managed by a second data center. Resources may include any item managed and/or stored by the data centers and available for access by one or more users, such as an application, a document, a file, and/or the like. A user may have to be authenticated and authorized by the first data center in order to access the first resource and may have to be authenticated and authorized by the second data center in order to access the second resource. The enterprise computer network may offer a single sign-on (SSO) functionality that allows a user to log into one data center and then access other data centers using the same authentication session without re-logging in each time a different data center is accessed. For example, SSO allows a user to enter a username/password once in order to gain access to multiple resources located across different data centers.

A single SSO session may be created for a user at a data center when the user is authenticated and/or authorized by the data center. The user's sessions are coordinated among the various data centers as the user accesses different resources dispersed among the data centers. A unique session identifier (ID) may be created for each session for each user. For example, a user may have access to two different resources stored and/or managed in two different data centers. Thus, a first data center may create a session at the first data center for a user with a unique session ID (e.g., session ID 1), and the second data center may adopt that session (e.g., by creating a session at the second data center for the user with the same session ID 1). Thus, even though there are 'separate' sessions created for the user in each of the data centers, each of those sessions may belong to the same, single SSO session that is tracked using the unique session ID. A user request for one or more resources may hop across data centers within a single SSO session, and each data center may generate a session with the same unique session identifier for servicing the user request.

All sessions for the user should be synchronized so that all of the session information is consistent across the data centers. Further, when the user is logged out of a session at one data center and/or a session for the user at the data center is terminated, all other sessions should be terminated as well so that the user's sessions are logged out or terminated globally.

In some embodiments, a user may be limited to a certain number of SSO sessions (not to be confused with the individual sessions established at each data center). For instance, a user may be limited to a single SSO session, that when established, creates a separate session for the user at each of the data centers that the user can hop between. Thus, another person (e.g., looking to pass off as the user) may not be able to establish another SSO session for the user if the user has already established a SSO session. In order to maintain a limited number of SSO sessions, each data center must be aware of the existing SSO sessions for a user and the SSO session limit for that user, otherwise the other person may easily be able to establish an additional SSO session at a different data center than the data center the user has a SSO session with. Thus, in some embodiments, each data center may store security data associated with each user, which can include a "lockedBy" identity attribute for that user. The "lockedBy" attribute may be set to have a value of an identifier of a data center at which the current SSO session has been established for the user. This security data can be shared and synchronized between the data centers, so that each data center can determine whether an active SSO session exists for any particular user (along with information about which data centers) in order to enforce SSO session limits for the user (e.g., by preventing the creation of another SSO session).

A web gate may provide employee access control and may operate to protect the data center and any resources within the data center against external and internal web-based threats.

For example, a web gate may include an agent component and a server side component. Each resource is protected through an agent of the web gate. Each agent may be associated with a particular data center with which the resource is stored and/or managed. The associated data center for an agent may be referred to as the web gate agent's end point. The web gate agent may intercept user requests for one or more resources protected by it and check for user credentials in order to authenticate the user. The agent may then contact an access manager server to verify whether the resource is a protected resource that requires credentials for access. If the access manager indicates that the resource is not protected, the agent will grant access to the user. If the resource is protected, the agent will challenge the user for credentials.

An access manager server enables SSO functionality within the data center and may perform various session related functions for managing access to the corresponding data center. For example, the access manager server may perform authentication and/or authorization of the client device when a user attempts to access one or more resources within the data center. Authentication is the process of proving that a user is who the user claims to be. To authenticate a user, the access manager server (e.g., using a web gate) may present a user with a request for authentication credentials in the form of a challenge (e.g., via the user's web browser). Authentication policies may specify the authentication methodology to be used for authenticating the user for whom the access must be provided on a given resource. The policies define the way in which the resource access is to be protected (e.g., type of encryption, or the like).

Authorization is the process of determining if a user has a right to access a requested resource. Authorization policies may be defined that specify the conditions under which a user or group of users has access to a resource. For example, an administrator may only authorize certain users within a group to access particular resources.

An access manager server may receive and analyze cookies from client devices and/or session information from one or more data centers. An access manager may also manage session policies, which may include policies relating to re-authentication, session invalidation, and/or session retrievals. As used herein, "re-authentication" refers to a situation in which a user must re-enter credentials in order to be authenticated anew. "Session invalidation" may refer to the invalidation of sessions that may exist for a user in data centers other than the data center with which the user is currently interacting. In some embodiments, invalidation of a user session may include terminating the remote user session through a front-channel or back-channel operation. For example, front-channel communications may use a hypertext transfer protocol secure (HTTPS) protocol while a back-channel operation communication may use an open access protocol (OAP), or vice versa. In some embodiments, only back-channel invalidation of a user session are supported. As used herein, "session retrieval" or "on-demand session retrieval" may refer to the retrieval of session information from a remote data center before the creation of a local user session in a servicing data center. Session retrieval may be needed to ensure that dynamic session information is not lost when a user moves across data centers. Session retrieval may also ensure timeout information is tracked consistently across data centers so that a user is properly timed-out of a session when appropriate. Retrieval of session information may be done using a front-channel or back-channel operation.

In some embodiments, multiple access manager servers can be deployed as an access manager cluster in a data center, which allows for scalability and high availability. Multiple such geographically dispersed data centers with access manager clusters can be connected (wired or wirelessly) to constitute an access manager Multi Data Center (MDC) deployment. An access manager MDC satisfies high availability, load distribution, and disaster recovery requirements of access servers within an enterprise computer network. The MDC may act as a single logical access server and provides single sign on (SSO) functionality for all of the resources registered in the MDC. In order to achieve SSO across the data centers, back end user sessions need to be migrated from the originating data center to the data center that is servicing the user. However, synchronization of the databases among the data centers may not be practical due to latencies involved in transmitting data between the geographically dispersed databases. Accordingly, migration of user sessions may be accomplished using on demand session migration or session retrieval from each data center.

In the MDC deployment, data centers can be geographically located around the world (e.g., one on each continent). A user request to access a resource can hop across multiple data centers. The user request may be received by a web gate agent or load balancer, which will direct the user's request to the appropriate data center (e.g., to the nearest data center or to a data center that will load balance the requests across different data centers). The request may be handled by one of the data centers (e.g., a first data center), and in some cases, once a session for the user is established at that data center that session may also be adopted by the other data centers (e.g., a second data center). For example, the first data center will create for the user a session with a unique session identifier. If the user is sending a request to another data center (e.g., the second data center) through the same application or browser used to establish the session, then the user may provide the second data center a cookie/token that was received from the first data center. The second data center may read the cookie/token data and extract the server side session information, which can include session identifier information and other details. For instance, the second data center may determine from the information that the session was originally initiated by the first data center. In order to provide SSO, the second data center may adopt that session (e.g., by creating a session at the second data center) while preserving the same session identifier, allowing the user to access resources (e.g., resources governed by the second data center). It should be noted that this session adoption by the second data center only applies if the request is coming from the same application or browser associated with the established session.

In some cases, the user may be restricted to a maximum of one SSO session across the data centers (e.g., based on policies set by an organization associated with the user). Each of the data centers may be configured to enforce the maximum session limit locally (e.g., each data center will make sure that there is only one active session for the user at that data center). However, there may be issues associated with enforcing the maximum of one concurrent SSO session across the data centers and syncronizing the enforcement. Failure to do so can lead to a scenario, in which a first access request will go to a first data center while a second access request goes to a second data center (e.g., due to load balancing or geographical affinity). If the data centers do not communicate and coordinate with each other, then the second data center (which only has local session management) will not be able to coordinate the enforcement of a single SSO session across the data centers. The second data center may end up establishing a second SSO session (e.g., having a different unique session ID) for a user, which is a result that can be maliciously exploited (e.g., a malicious user can bypass the load balancer and use stolen user credentials for a valid user to be awarded with a session). Thus, to prevent this from happening, the data centers have to coordinate and synchronize enforcement of the maximum session limit across all of the data centers.

Accordingly, the present disclosure relates generally to maintaining and enforcing a maximum single sign-on (SSO) session limit across multiple data centers of a multi data center (MDC) deployment. In some cases, a user with a SSO session may be able to access one or more resources governed by the data centers, which may include any item managed and/or stored by a computing system, such as an application, a document, a file, electronic content, and/or the like. In some cases, a resource may be identified by a uniform resource locator (URL) or other data indicating a source of the resource.

In some embodiments, the enforcement of a maximum SSO session limit across multiple data centers is performed through the use of a centralized data store (e.g., an identity store or identity data store) accessed by the data centers. The centralized data store may contain the identity attributes associated with each user, including the 'lockedBy' attribute for each user, which may provide the data center identifier for any data center that has established an ongoing SSO session for the user. However, in other embodiments, the enforcement of a maximum session limit across multiple data centers is preferably performed through the use of a data store (e.g., an identity store or identity data store) at each of the data centers. The use of multiple data stores across the data centers may be preferable for high availability and disaster recovery (HA/DR), since each data center would have all the information it needs locally. In some embodiments, the enforcement of a maximum session limit across multiple data centers is performed through the use of multiple centralized data stores accessed by the data centers, which may provide for HA/DR. For example, there may be two centralized data stores that are in sync and maintained separately from the multiple data centers, which contain the identity attributes associated with each user.

In some embodiments, each data center would store user identities in a data store (which can be outside of the access management system). Each data store may store the identity of any given user, along with security data associated with that user. In some embodiments, the security data for a user may be a term that is used interchangeably with the identity of the user. In some embodiments, the security data may include any identity attributes associated with the user. In some embodiments, each user may be associated with an identity attribute, 'lockedBy', which serves the role of a session lock across the multiple data centers by dictating whether an access request can be serviced to create a brand new SSO session.

In some embodiments, there may be an access manager deployed across multiple data centers. Each data center of the multiple data centers may be associated with its own identifier, such as a ClusterID. Each user may be associated with their own identity attribute, 'lockedBy', that is preserved in the identity stores across each the multiple data centers. The identity stores across the data centers may be in sync, with the specific 'lockedBy' attribute excluded from any replication rules associated with the identity stores, such that the original values for the 'lockedBy' attribute set by each data center will be preserved. The synchronization between different identity stores of the data centers may depend on the configuration, but it may be performed quickly (e.g., in the order of minutes) in order to keep the identity stores identical.

In some embodiments, once a change to the 'lockedBy' attribute is made at one identity store, the access management system of that data center may propagate and push the change out to the other data centers. In some embodiments, this may be performed by the data center executing a synchronous call to the other data centers. In some embodiments, an access management system of a data center may, during the evaluation of session creation, pull values for the 'lockedBy' attribute from the identity store of other data centers in order to determine changes. The time needed for an access management system to check each identity store may result in a few milliseconds of delay, which may be a desirable tradeoff versus a central database, which provides no redundancies for disaster recovery.

In some embodiments, the prerequisite for session creation at a data center may be to update the 'lockedBy' attribute of the user (preserved in that data center's identity store) to the current data center's ClusterID in order to acquire the lock. If the lockedBy attribute in the identity store can be updated successfully to the current data center's ClusterID (e.g., it has no value or the value is equivalent to the current data center's ClusterID), it means that the access manager can proceed to create a new SSO Session in that specific data center. In some embodiments, updating the 'lockedBy' attribute associated with a user may entail a synchronous call to all the participating data centers of the multiple data centers, such that the 'lockedBy' attribute for the user is updated at all of the identity stores with the current data center's ClusterID. However, in some cases the lockedBy attribute in the identity store will not be modifiable (e.g., it has a value that does not match the ClusterID of the current data center servicing the user's access request), which means that lock cannot be acquired and the session creation request will be rejected in order to enforce the single session per user constraint. Since the 'lockedBy' attribute for each user will be synched across the multiple data centers, the single session per user constraint is effectively evaluated across all of the data centers prior to the creation of any new SSO sessions.

As an example, a user may issue a first access request to a first data center of the multiple data centers. This access request is evaluated by the access manager and authenticated using the appropriate authentication scheme. Upon validating the user credentials from the access request, the access manager will check the identity store for the first data center (and in some embodiments, all the other data centers) to determine the 'lockedBy' attribute for the user. If the 'lockedBy' attribute is empty or equal to the ClusterID of the first data center, the access manager will determine there is no active session for the user and will create a new SSO session for the user at the first data center. At the same time, the 'lockedBy' attribute for the user will be updated with the ClusterID of the first data center. This new value for the 'lockedBy' attribute will be pushed out to the other data centers. For instance, the 'lockedBy' attribute for the user at the identity store for a second data center will be updated with the ClusterID of the first data center. If, at a later time, a second access request is sent to the second data center with the user credentials for the original user (e.g., that were used in the first access request), and the access manager will check the identity store for the second data center to determine the 'lockedBy' attribute associated with the original user (since the original user's credentials were used).

If the original user has an existing SSO session (e.g., at the first data center), then the 'lockedBy' attribute at the identity store of the second data center will be equal to the ClusterID of the first data center. Since the 'lockedBy' attribute is not equal to the identifier of the current data center, this means that the lock cannot be acquired and the second access request will be rejected by the second data center in order to enforce the single session per user constraint.

Some embodiments, such as systems, methods, and machine-readable media are disclosed for enforcing single sign-on (SSO) limits. FIG. 1 illustrates a system 100 in which users may be restricted to one single sign-on (SSO) session while accessing resources stored across multiple data centers, thereby maintaining the security of those resources by enforcing a single SSO session for each user across the multiple data centers that cannot be bypassed through the use of multiple clients (e.g., applications and devices).

More specifically, FIG. 1 illustrates a system 100 in which a user (e.g., user 102) may operate one or more clients (e.g., an application on a device or a device) to access an enterprise computer network with infrastructure distributed across various geographically dispersed data centers, such as the data centers 135 and 180. The device may be any workstation, personal computer (PC), laptop computer, smart phone, wearable computer, or other networked electronic device. The data centers 135 and/or 180 may include applications, web gates, and one or more access manager servers, along with other infrastructure, such as identity stores, databases, or the like. A data center may provide a user access to various resources stored and/or managed by the data center cluster. For instance, the user 102 may utilize device 114 to interact with the data center 135 to gain access to a resource, such as one of the applications 120. In some cases, the data center 135 would grant access only upon the user 102 being successfully authenticated and/or authorized to access the requested resource. This may involve checking user-supplied credentials against user IDs stored in an identity store (e.g., data store 150). For instance, the user 102 may supply credentials that correspond to a user identity in the data store 150.

For instance, the user 102 may operate a first client (e.g., device 104 or application 106 executing on device 104) to request access to resources. In some embodiments, the resources may be accessible through the set of applications 120 accessible to the user based on authentication of credential information, or the resources may be accessible through the set of applications 120. A user (e.g., the user 103) may also operate a second client (e.g., device 114 or application 116 executing on device 114). It should be noted that user 102 and user 103 may be the same user (e.g., the same person using two different devices) or user 102 may be a different user from user 103 (e.g., two different people using two different devices). Accordingly, any description herein in connection to user 102 may be applicable to either user 102 and/or user 103 shown in FIG. 1.

Each of device 104 and device 114 may include a computing device. The computing device may include a computing system such as one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Device 104 and device 114 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Devices 104, 114 may be implemented using hardware, firmware, software, or combinations thereof.

Each of devices 104, 114 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. Devices 104, 114 may be implemented to operate using in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

A user 102 operating a client device, e.g., device 104 or device 114, may present one or more interfaces that accept input to enable a user to interact with an access management system (e.g., access management system 140 or access management system 170). The interfaces may be accessible using an application (e.g., application 106 or application 116) executing on a device. The application and/or interfaces may be provided by access management system 140 or access management system 170 as part of a service. In some embodiments, which access management system the user 102 interacts with may depend on the geographic location of the client device and its proximity to a data center. For instance, as shown in the figure, the device 114 may be in proximity with the data center 135 implementing the access management system 140, and thus the operation of the device 114 may result in the user 102 interacting with the access management system 140. Similarly, device 104 may be in proximity with the data center 180 implementing the access management system 170, and thus the operation of the device 104 may result in the user 102 interacting with the access management system 170. However, other methods for determining which data center services a particular access request (e.g., such as based on data center load) may be employed.

The access management system 140 (and similarly, access management system 170) may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. The access management system 140 may be implemented using hardware, firmware, software, or combinations thereof.

In some embodiments, both access management system 140 and access management system 170 may each be implemented by multiple computing devices (e.g., server computers) deployed as a cluster. Each of the server computers in the cluster may be a different computing node, which may communicate with one or more clients. Each computing node may handle authentication and authorization for session management. The cluster may be deployed as part of a data center, which allows for scalability and high availability. For instance, the access management system 140 may be implemented by the cluster of data center 135, and the access management system 170 may be implemented by a cluster of data center 180. Multiple geographically-dispersed data centers with access manager server clusters (e.g., data center 135 and data center 180) can be connected (wired or wirelessly) to constitute a multi-data center (MDC) system. A MDC system may satisfy high availability, load distribution, and disaster recovery requirements of access servers within an enterprise computer network. A MDC system may act as a single logical access server to support SSO services for the access management system, including any instances of the access management system (e.g., access management system 140 and access management system 170).

Access management system 140 (and similarly, access management system 170) may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include session engine 142 and authorization engine 144, each of which may be implemented in hardware, software (e.g., program code, instructions executable by a processor) executing on hardware, or combinations thereof In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

As shown in FIG. 1, a user 102 using device 114 may engage in communication with access management system 140 to access resources, such as any application in the set of applications 120 or the resources accessible through the set of applications 120. Similarly, a user 102 using device 104 is depicted as engaging in communication with access management system 170 to access resources, such as any application in the set of applications 120 or the resources accessible through the set of applications 120. However, the embodiments disclosed herein are for illustrative purposes only. For instance, device 114 may be used to communicate with access management system 170, and device 104 may be used to communicate with access management system 140. In some embodiments, the device used by the user 102 may engage in communication with an access management system at a data center best equipped to handle the user's request (e.g., for load balancing purposes). In other embodiments, the device used by the user 102 may engage in communication with an access management system at a data center that is closest in geographic proximity to the device.

For instance, when using device 114, the user 102 may engage in communication with the access management system 140 rather than access management system 170 due to the geographical proximity between the device 114 and the data center 135 hosting the access management system 140. As depicted in the figure, and for the purpose of facilitating understanding in the ensuing description, device 114 is used to communicate with the access management system 140 due to geographic proximity, whereas device 104 is used to communicate with the access management system 170 due to geographic proximity.

The set of applications 120 may be accessible to user 102 upon successful authentication of credential information for user 102. Before one of applications 120 is accessible to user 102 at device 114, user 102 may be authenticated for a session that provides user 102 with access to applications 120. The device 114 may initiate an authentication process by requesting access from access management system 140. The authentication process may include device 114 displaying one or more GUIs to receive credential information of a user and submitting a request for authentication to access management system 140. Authentication may be established based on verifying credential information of the user 102.

In attempting to access a resource through the device 114, the user 102 may operate an application (e.g., application 116) that manages access to a user's account via access management system 140. For example, application 116 may be an access management application that may present GUIs. Using application 116, user 102 may request access to one or more resources, engage in authentication, and request modification of an authentication level.

Device 114 may communicate with access management system 140 via communication network 130. Examples of communication networks may include a mobile network, a wireless network, a cellular network, a local area network (LAN), a wide area network (WAN), other wireless communication networks, or combinations thereof.

Communications between device 114 and access management system 140 can be received through a gateway system. The gateway system may support access management services. For example, a single sign-on (SSO) gateway may implement one or more access agents, e.g., a web gate agent, to balance and/or handle requests from clients and access management system 140.

In some embodiments, the authentication of a user (e.g., user 102) and the authorization of the user to access specific resources may be managed by a web gate and/or one or more access management systems implemented at one or more data centers. For instance, a user may be authenticated and authorized by an access management system 140 implemented at a data center 135, or a user may be authenticated and authorized by an access management system 170 implemented at a data center 180. In some embodiments, the access management system 170 and the access management system 140 may both be instances of the same access management system that are implemented at different data centers; accordingly, any discussion of the access management system 140 may be applicable to the access management system 170.

To perform the authentication and/or authorization, the access management system (e.g., access management system 140) of a data center may present the user (e.g., user 102) a request for authentication credentials (e.g., user name/password, or the like). In some embodiments, some resources within the data center 135 may not protected, in which case the access manager system 140 may first determine if the requested resource is protected. If a web gate is used, the web gate may forward the user credentials to the access manager system 140. The access manager system 140 authenticates the user 102 upon receiving the proper credentials by validating the credentials against those stored in a user directory. As a result, the user 102 is logged into the data center 135 and a session is created for the user in the data center 135. For the purposes of illustration, a "session" as described herein includes an SSO session. However, a session may include other types of sessions enabling access to a user. The access management system 140 and the access management system 170 may each provide access to one or more resources. The access management system 140 and the access management system 170 may both implement a single sign-on system, e.g., a SSO system, which can establish an SSO session to provide SSO access to one or more resources.

Once the user 102 is logged in to the session, the user 102 may access resources for which the user is authorized to access, such as running different applications, accessing cloud storage, or the like. The user 102 may communicate using the client device, which communicates with the data center using a particular protocol (e.g., hypertext transfer protocol (HTTP) or hypertext transfer protocol secure (HTTPS)). The protocol may be determined based on the type of resource. For example, an HTTPS request may be required to request sensitive or confidential resources.

In some embodiments, the access management system 140 may include a session engine 142 that further manages authentication of a user and the one or more sessions created to enable access for the user. Upon receiving the credential information, session engine 142 may verify whether a requested resource, e.g., one of the applications 120, is a protected resource that requires credentials for access. Session engine 142 may request authorization engine 144 to determine whether access to a resource is protected. Upon determining that access determines that the resource is not protected, session engine 142 may grant access to a resource. Upon determining that access to a resource is protected, session engine 142 may determine authentication of user 102 based on the credential information.

The access management system 140 may also include an authorization engine 144 to determine authorization of a user to access particular resources. Upon determining authentication of user 102, authorization engine 144 may determine whether user 102 is authorized to access a resource based on access permitted to user 102. Session engine 142 may send a communication to device 114 to indicate whether access to a resource is permitted by user 102. The requested resource may be enabled to user 102 based on whether access is permitted.

The access management system 140 may store session information for each session created to enable a user with access. Session information may include, without restriction, 1) authenticated user subject information such as user identity information (e.g., user identifier, user domain name, user group user identification (GUID), and group membership for user); 2) list of partners accessed in session; 3) Internet protocol (IP) address of a client; 4) authentication level; 5) authentication scheme; 6) authentication timestamp; and 7) application domain information for one or more resources that are accessed. In some embodiments, the access management system 140 may store the session information in a session data store 160. Similarly, the access management system 170 may also store similar session information in a session data store 172.

Resources (e.g., applications 120) may be accessible to user 102 based on successful authentication of credential information. Resources may also include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource computer server that provides access to one or more resources upon authentication of the user 102 in a SSO system. Although a user may be authenticated with access, each user may have different rights to access different resources. As such, authorization may be determined for each resource. Authorization may be determined for each resource server that provides a resource.

The access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices.

In some embodiments, access management system 140 may use one or more policies stored in a data store 162 ("policies") to control access to resources. Policies 162 may include an authentication policy that specifies the authentication methodology to be used for authenticating the user for whom the access must be provided on a given resource. Policies 162 may include an access policy that defines the way in which the resource access is to be protected (e.g., type of encryption, or the like). Policies 162 may include an authorization policy that specifies the conditions under which a user or group of users has access to a resource. For example, an administrator may only authorize certain users within a group to access particular resources.

In some embodiments, policies 162 may include an authorization policy that specifies a maximum number of single sign-on (SSO) sessions permitted for a user across the multi-data center (MDC) system. For instance, there may be a policy that specifies that any particular user may only have a single SSO session across the MDC system (e.g., between the data center 135 and the data center 180). Prior to establishing a SSO session for a user, the data center may check the authorization policy for the user against the number of existing SSO sessions for the user to determine if additional sessions can be established.

The access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to, or includes, one or more data stores for storing data such as a data store 150 (in some embodiments, an "identity data store"), session data store 160, and policies 162. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Session engine 142 may handle processing to determine whether a valid session exists for user 102 to access a resource. Access management system 140 may store session data in session data store 160. In some embodiments, any rarely-changing information (e.g., subject information) may be stored in session data store 160. The subject information may be obtained from a data store 150. Session information that changes frequently may be sent to a client device for storage and received in communication from the client device. Session engine 142 checks for a valid session for user 102 to access a requested resource that is protected. Session engine 142 may assess validity of a session for user 102 based on consideration of one or more access policies applicable to user 102. Based on determining that a valid session does not exist for user 102, session engine 102 may request credential information (which may be referred to as "credentials") from user 102. Successful authentication of the credential information may provide the user with access to one or more resources, which may include a requested resource.

Requests may be communicated to device 114 via communication network 130. A request may prompt user 102 for user credentials to determine authentication of a session. Request may include information (e.g., a URL) to a web page or a user interface (e.g., a web page, portal, or dashboard) to receive credential information.

Session engine 142 may perform operations to authenticate credential information for user 102. In some embodiments, session engine 142 may store information about sessions established upon successful authentication of a user. For a SSO session (e.g., SSO authenticated sessions), the SSO session may be managed as a SSO session enabling access to all resources accessible to user based upon successful authentication of credential information for a user.

In some embodiments, session engine 142 may communicate with authorization engine 144 regarding the scope of authentication. Session engine 142 can send the scope information received from device 114 to authorization engine 144. Authorization engine 144 can determine resources that are protected and, based on authentication sessions, can determine resources that are permitted and/or restricted for a session.

In some embodiments, access management system 140 may be implemented in system 100 according to an agent-server model for communication between device 114 and any one of access manager servers implemented for access management system 140. The agent-server model may include an agent component (e.g., a gateway system) and a server component. The agent component may be deployed on a host system and the server component may be deployed on a server, e.g., an access manager system. The user 102 operating device 114 may communicate with access management system 140 via the agent using an enterprise computer network. In some embodiments, the agent may be an application or embedded in an application on a device. The device may be a workstation, personal computer (PC), laptop computer, smart phone, wearable computer, or other networked electronic device.

The Agent may provide access control and may operate to protect access management system 140 and any resources accessible through access management system 140 against external and internal web-based threats. Access management system 140 may communicate with one or more resource computing systems (e.g., resource servers) that provide access to one or more resources, e.g., applications 120. Agent may implement or operate as the agent component access management system 140 and may include a server that operates as the server component. Each resource accessible by access management system 140 may be protected through an agent, e.g., agent. Agent may intercept user requests for one or more resources protected by it and check for user credentials in order to authenticate the user. The agent may then contact a server, e.g., an access manager server at access management system 140. The access management server may verify whether a resource is a protected resource that requires credentials for access. If the access management server determines that the resource is not protected, agent may grant access to user 102. If the resource is protected, agent may request user 102 to provide authentication credentials.

In some embodiments, communication between the agent and access management system 140 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 140. Each channel may communicate using an access token designed for the type of communication over the channel. The access flow may generate two types of browser tokens. A first token is an access management ID token (e.g., OAM_ID token), which serves the SSO requests that are being propagated over HTTP. A second token may be an authorization token (e.g., OAMAuthn Token) that may be used to service the SSO requests that are being propagated over OAP. The browser tokens may be stored as host cookies at device 114.

Access management system 140 (e.g., using agent) may present user 102 with a request for authentication credentials in the form of a challenge (e.g., via the user's web browser at device 114). In some embodiments, user 102 can access a SSO user interface through a client executing on device 114 or through a web browser on device 114. The SSO user interface may be implemented at access management system 140. Access management system 140 may send, with a request, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application, e.g., application 140, through the SSO user interface, a request may be sent from device 114 to access management system 140 to determine a policy type for the application from one or more policies 162 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on device 114. If user 102 is not authorized, then access management system may request credentials from user 102. The SSO user interface may present an interface to receive input including credential information. The credential information may be sent to the access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

Similarly, a user 102 using device 104 (which is closer in proximity to data center 180 than data center 135) may engage in communication with access management system 170 to access resources, such as any application in the set of applications 120 or the resources accessible through the set of applications 120. The set of applications 120 may be accessible to user 102 upon successful authentication of credential information for user 102. Before one of applications 120 is accessible to user 102 at device 104, the user 102 would still need to be authenticated for a session that provides user 102 with access to applications 120. The device 104 may initiate an authentication process by requesting access from access management system 170. The authentication process may include device 104 displaying one or more GUIs to receive credential information of a user and submitting a request for authentication to access management system 170. Authentication may be established based on verifying credential information of the user 102.

In attempting to access a resource through the device 104, the user 102 may operate an application (e.g., application 106) that manages access to a user's account via access management system 140. For example, application 106 may be an access management application that may present GUIs. Using application 106, user 102 may request access to one or more resources, engage in authentication, and request modification of an authentication level. The device 104 may communicate with access management system 170 via communication network 170. Examples of communication networks may include a mobile network, a wireless network, a cellular network, a local area network (LAN), a wide area network (WAN), other wireless communication networks, or combinations thereof.

Communications between device 104 and access management system 170 can also be received through the gateway system for supporting access management services. For example, a single sign-on (SSO) gateway may implement one or more access agents, e.g., a web gate agent, to balance and/or handle requests from clients and access management system 170.

The protected resources (e.g., applications 120) may be accessible to user 102 based on successful authentication of credential information. Upon receiving the credential information, the access management system 170 may (in some cases, through a session engine and/or authorization engine)

verify whether a requested resource is a protected resource that requires credentials for access. Upon determining that access determines that the resource is not protected, the access management system 170 may grant access to a resource. Upon determining that access to a resource is protected, the access management system 170 may determine authentication of the user 102 based on the credential information. Upon determining authentication of user 102, the access management system 170 may determine whether user 102 is authorized to access a resource based on access permitted to user 102. The access management system 170 may send a communication to device 104 to indicate whether access to a resource is permitted by user 102, and the requested resource may be enabled to user 102 based on whether access is permitted.

The access management system 170 may provide many SSO services including management of access (e.g., granting/denying access) to resources, automatic sign-on, application password change and reset, session management, application credential provisioning, as well as authentication of a session. In some embodiments, access management system 170 can provide automatic single sign-on functionality for applications 120, such as Windows® applications, Web application, Java® applications, and mainframe/terminal-based applications running or being accessed from client devices. As explained above, access management system 170 may perform the authentication of a user (e.g., user 102) operating a client device (e.g., device 104).

In some embodiments, access management system 170 may also adhere to one or more policies stored in a data store 174 ("policies") to control access to resources. Policies 174 may include an authentication policy that specifies the authentication methodology to be used for authenticating the user for whom the access must be provided on a given resource. Policies 174 may include an access policy that defines the way in which the resource access is to be protected (e.g., type of encryption, or the like). Policies 174 may include an authorization policy that specifies the conditions under which a user or group of users has access to a resource. For example, an administrator may only authorize certain users within a group to access particular resources. In some embodiments, policies 174 may include an authorization policy that specifies a maximum number of single sign-on (SSO) sessions permitted for a user across the multi-data center (MDC) system. For instance, there may be a policy that specifies that any particular user may only have a single session across the MDC system (e.g., across the data center 135 and the data center 180). Thus, prior to a data center (e.g., data center 135) establishing a session for a user (e.g., user 102), that data center may check the authorization policy for a user to determine the maximum number of sessions allowed to a user. The data center may also check (e.g., by looking at the security data or identity attribute associated with the user) to see the session status for any active sessions associated with the user and compare it against the maximum number of sessions allowed to the user. Thus, the data center may only establish additional sessions if the number of active sessions is less than the maximum allowed (e.g., if a user is allowed a maximum of a single session and there are currently no sessions associated with the user).

The access management system 170 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 170 is coupled to or includes one or more data stores for storing data such as session data store 172 and policies 174. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Access management system 170 may store session data in session data store 172. In some embodiments, any rarely-changing information (e.g., subject information) may be stored in session data store 172. Session information that changes frequently may be sent to a client device for storage and received in communication from the client device. The access management system 170 may check for a valid session for user 102 to access a requested resource that is protected, and the check may be based on consideration of one or more access policies applicable to user 102. Based on determining that a valid session does not exist for user 102, the access management system 170 may request credential information from user 102. Successful authentication of the credential information may provide the user with access to one or more resources, which may include a requested resource.

Requests may be communicated to device 104 via communication network 132. A request may prompt user 102 for user credentials to determine authentication of a session. Request may include information (e.g., a URL) to a web page or a user interface (e.g., a web page, portal, or dashboard) to receive credential information.

The access management system 170 may perform operations to authenticate credential information for user 102. In some embodiments, the access management system 170 may store information about sessions established upon successful authentication of a user. For a SSO session (e.g., SSO authenticated sessions), the SSO session may be managed as a SSO session enabling access to all resources accessible to user based upon successful authentication of credential information for a user. The access management system 170 may also determine resources that are protected and determine resources that are permitted and/or restricted to a user for a session.

In some embodiments, access management system 170 may be implemented in system 100 according to an agent-server model for communication between device 104 and any one of access manager servers implemented for access management system 170. The agent-server model may include an agent component (e.g., a gateway system) and a server component. The agent component may be deployed on a host system and the server component may be deployed on a server, e.g., an access manager server. User 102 operating device 104 may communicate with access management system 170 via agent using an enterprise computer network. In some embodiments, the agent may be an application or embedded in an application on a device. The device may be a workstation, personal computer (PC), laptop computer, smart phone, wearable computer, or other networked electronic device.

Agent may provide access control and may operate to protect access management system 170 and any resources accessible through access management system 170 against external and internal web-based threats. Access management system 170 may communicate with one or more resource computing systems (e.g., resource servers) that provide access to one or more resources, e.g., applications 120. Agent may implement or operate as the agent component access management system 170 and may include a server that operates as the server component. Each resource accessible by access management system 170 may be protected through an agent, e.g., agent. Agent may intercept user requests for one or more resources protected by it and check for user credentials in order to authenticate the user. The agent may then contact a server, e.g., an access manager server at access management system 140. The access management server may verify whether a resource is a protected resource that requires credentials for access. If the access management server determines that the resource is not protected, agent may grant access to user 102. If the resource is protected, agent may request user 102 to provide authentication credentials.

In some embodiments, communication between the agent and access management system 170 may be split into two different channels of communication. For example, communication via a front-channel may use a hypertext transfer protocol secure (HTTPS) protocol. Front-channel communications may include less frequent communications, such as communications for credential collection operations for authentication. Communication via a back-channel may use an open access protocol (OAP). Back-channel communications may include more frequent communications, such as agent-server interactions including requests for access to a resource managed by access management system 170. Each channel may communicate using an access token designed for the type of communication over the channel.

The access flow may generate two types of browser tokens. A first token is an access management ID token (e.g., OAM_ID token), which serves the SSO requests that are being propagated over HTTP. A second token may be an authorization token (e.g., OAMAuthn Token) that may be used to service the SSO requests that are being propagated over OAP. The browser tokens may be stored as host cookies at device 104.

Access management system 170 (e.g., using agent) may present user 102 with a request for authentication credentials in the form of a challenge (e.g., via the user's web browser at device 104). In some embodiments, user 102 can access a SSO user interface through a client executing on device 104 or through a web browser on device 104. The SSO user interface may be implemented at access management system 170. Access management system 170 may send, with a request, the SSO user interface or information (e.g., a URL) enabling access to the SSO user interface.

In some embodiments, an SSO user interface can include a list of the applications user 102 commonly utilizes. User 102 can manage their credentials and policies associated with applications through the SSO user interface. When user 102 requests to access an application through the SSO user interface, a request may be sent from device 104 to access management system 170 to determine a policy type for the application from one or more policies 174 applicable to user 102. Access management system 170 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on device 104. If user 102 is not authorized, then access management system may request credentials from user 102. The SSO user interface may present an interface to receive input including credential information. The credential information may be sent to the access management system 170 to determine authentication of user 102.

It should be noted that, for the purposes of facilitating understanding, this disclosure provides examples, figures, and description that involves the evaluation of session creation for different devices (e.g., FIG. 1 shows a device 114 used to try to establish a session, as well as device 104 being used to try to establish another session). However, a new access attempt (e.g., request by a user to access resources) does not have to come from an entirely different device, and in some cases attempting to access resources using a different application or browser on the same device may be considered a new access that will trigger session enforcement. For example, the user 102 may send a request to access a resource using a first application (e.g., application 116) on device 114 and be granted a session for that first application. This session may be associated with the particular combination of the first application and the device 114. Thus, if the user 102 attempts to access the resource using a second application or browser on device 114, the access management system may consider this a new access attempt for enforcing the session limit. If the user 102 is permitted to have only one session, then the access management system would enforce that limit by not establishing a second session for the new access attempt (e.g., the request associated with the particular combination of the second application and the device 114). In some embodiments, for which the applications are browsers, access attempts using a new private window within the same browser may be considered a separate access attempt for the purposes of session enforcement. Thus, in various embodiments, the access management system may carry out session enforcement on requests coming from different devices, requests coming from different applications or browsers on the same device, or even requests coming from the same application and device.

Figure 2:
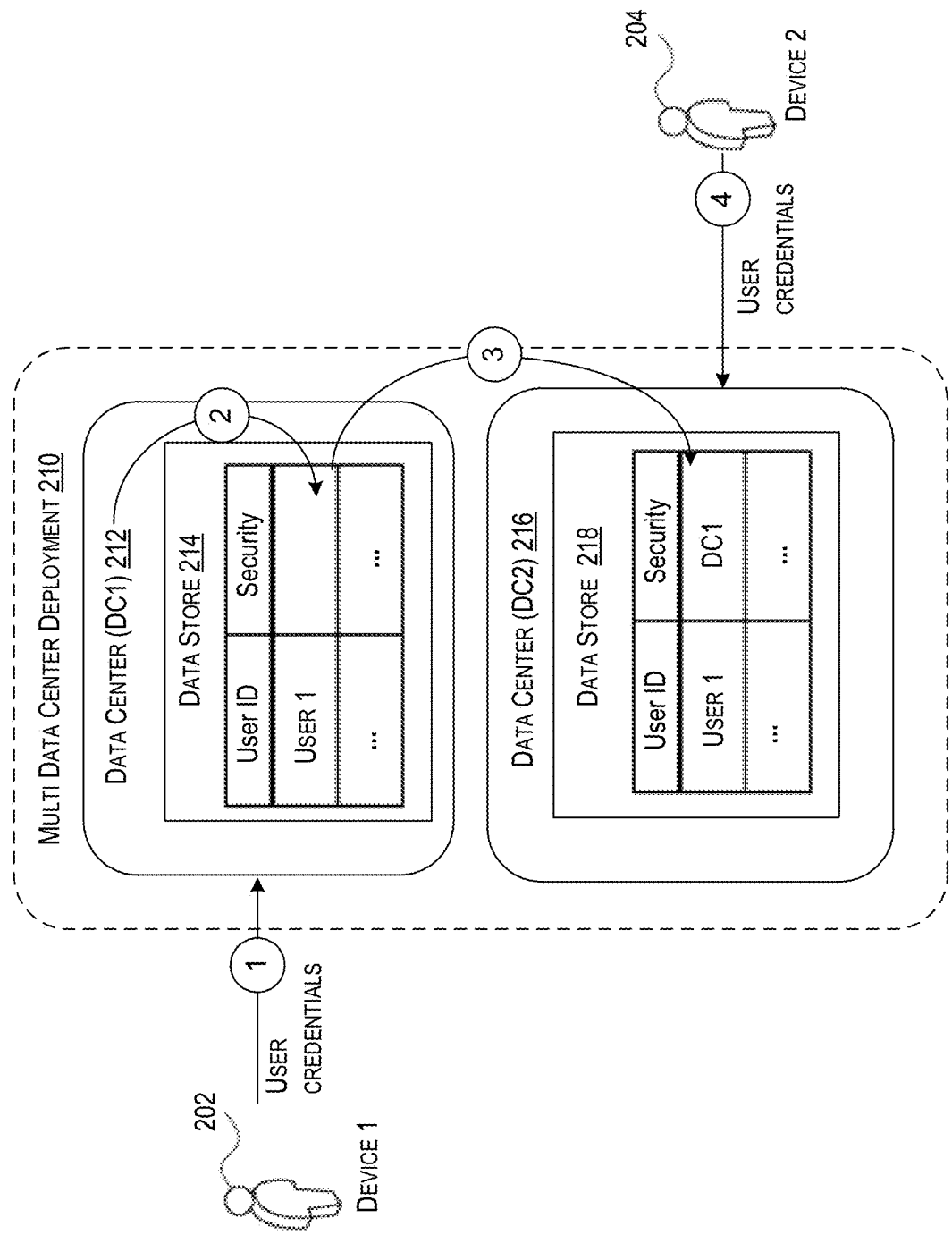
FIG. 2 illustrates steps associated with enforcing a single user session across multiple data centers, in accordance with an embodiment of the present disclosure.
Figure 3:
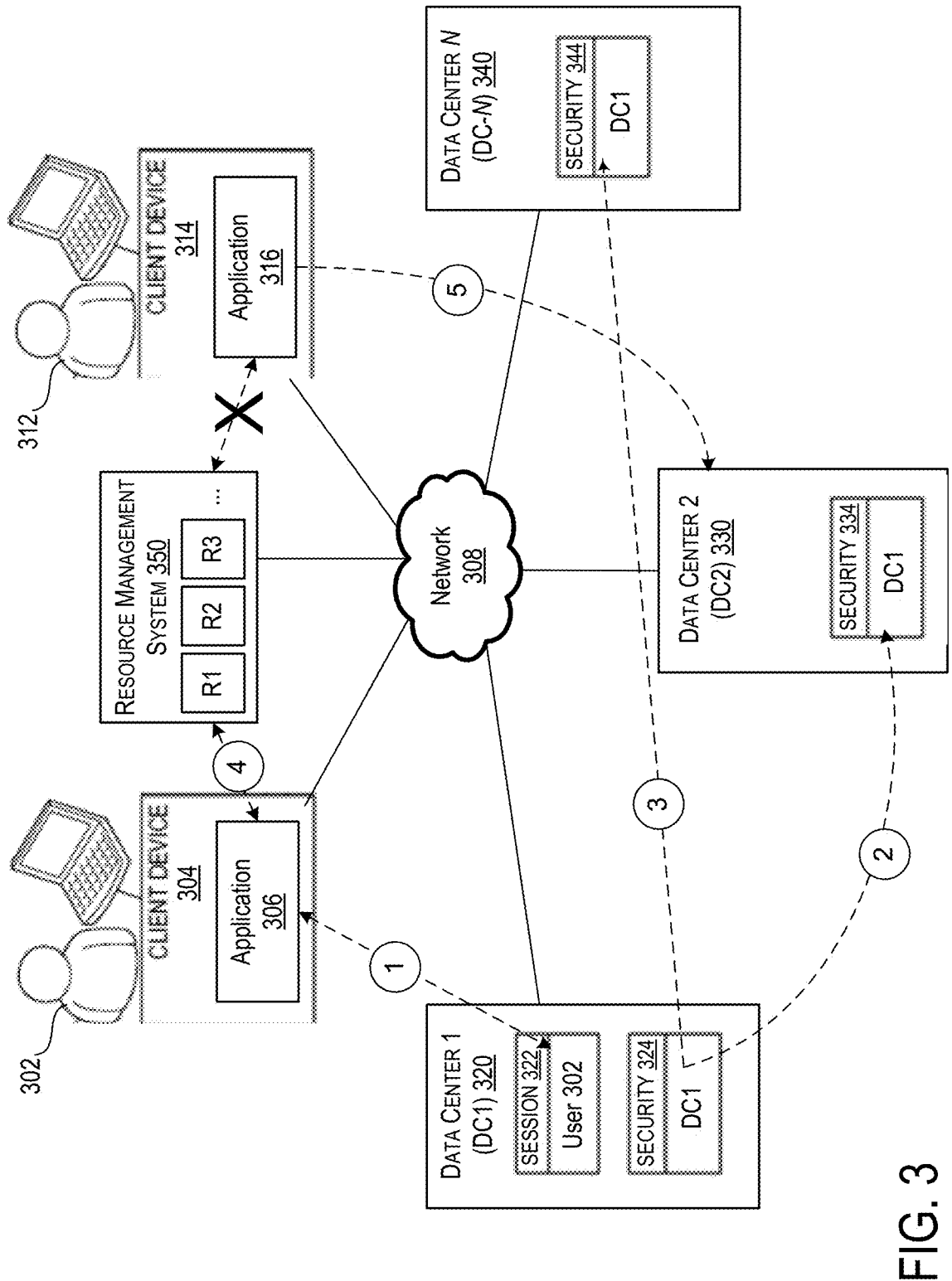
FIG. 3 illustrates steps associated with enforcing a single user session across multiple data centers, in accordance with an embodiment of the present disclosure.

FIGS. 2 and 3 illustrates steps associated with enforcing a single user session across multiple data centers, in accordance with an embodiment of the present disclosure. Some embodiments of the present disclosure, such as the one depicted in FIGS. 2 and 3, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as the steps described with reference to FIGS. 2-3, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by a computing system of an access management system, e.g., the access management system 140 of FIG. 1 implemented by data center 135 or the access management system 170 of FIG. 1 implemented by data center 180. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step.

While the processing depicted in FIGS. 2-3 may be described with respect to enforcing a single SSO session for a user across multiple data centers, such processing may be performed for multiple users. In other words, the processing depicted in FIGS. 2-3 may be described with respect to multiple sessions, each of which are associated with a different user. Furthermore, additional steps may be added or removed depending on the particular applications. One of ordinary skill in the art would recognize many variations, modifications, and alternatives.

In an aspect of some embodiments, each step in FIGS. 2-3 can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

With respect to FIG. 2, at circle 1, a user 202 operating a first device is shown supplying user credentials to a first data center 212 that is part of a multi data center deployment 210. In some embodiments, the user 202 may correspond to user 102 in FIG. 1, the first device may correspond to device 114 in FIG. 1, and the first data center 212 may correspond to data center 135 in FIG. 1. In the example depicted in FIG. 2, the user 202 may have already engaged in communication with an access management system implemented by the first data center 212 by requesting to access a resource through the first device, and circle 1 may be occurring after user credentials have been requested from the user 202 (e.g., during the authentication of the user 202).

If the user 202 is successfully authenticated, then prior to the access management system of the first data center 212 establishing a session for the user 202, the access management system of the first data center 212 may check a data store 214 for security data associated with the user 202. In some embodiments, the security data associated with the user 202 may be an identity attribute or include an identity attribute. In some embodiments, the identity attribute associated with user 202 may be referred to as a "lockedBy" identity attribute, and it may include an identifier associated with one of the data centers of the multi data center deployment 210. If the security data associated with user 202 does not include an identifier associated with one of the data centers of the multi data center deployment 210 (e.g., the identity attribute has no value), then the access management system may determine that no existing session exists for the user 202.

If no existing session exists for the user 202, then the access management system of the first data center 212 may establish a session for the user 202 to access the requested resource using the first device. At circle 2, the access management system of the first data center 212 may update the data store 214 to include an identifier (e.g., "DC1") of the first data center 212 into the security data associated with the user 202.

At circle 3, the security data in the data store 214 may be copied over to the data store 218 of a second data center 216. Thus, the identifier (e.g., "DC1") of the first data center 212 that has been associated with the user 202 may be copied over to the security data for the user 202 in the data store 218. At this point, both the data store 214 (of the first data center 212) and the data store 218 (of the second data center 216) will contain security data associated with the user 202 that includes a value for the identifier associated with the first data center 212 (e.g., "DC1").

At circle 4, a user 204 operating a second device may engage in communication with the access management system implemented at the second data center 216 of the multi data center deployment 210, and as part of the authentication process the user 204 may supply user credentials to the second data center 216.

With respect to FIG. 3, a multi data center deployment is shown that includes multiple data centers (e.g., a first data center 320, a second data center 330, . . . an Nth data center 340), with each data center implementing an instance of the access management system. The multiple data centers may be connected by a network 308 (e.g., the Internet) that allows the data centers to communicate with each other and share information, such as security data associated with specific users. In some embodiments, there may be a resource management system 350 that hosts one or more protected resources (shown in the figure as R1, R2, R3 . . . ) that users may desire access to, while in other embodiments, the protected resources may be hosted at one or more of the data centers of the multi data center deployment. The resource management system 350 may also be connected to the network 308, such that any client devices can access the resources of the resource management system through the network 308. In some embodiments, there may also be one or more client devices (e.g., client device 304 and client device 314, or the device 104 and device 114 in FIG. 1) that can communicate with the data centers and/or the resource management system 350 through the network 308.

In the figure shown, a user 302 may use a client device 304 or an application 306 operating on the client device 304 to request access to a protected resource (e.g., hosted by the resource management system 350), and that request may be sent to the first data center 320 based on the geographic proximity between the client device and the first data center 320. The application 306 may interact with the access management system implemented by the first data center 320 in order to authenticate and authorize the user 302 based on the user credentials supplied by the user 302. The access management system may check to see if an existing session exists for the user 302 across the multi data center deployment (e.g., by checking the security data associated with the user 302 that is maintained in the first data center 320).

If the authentication and authorization of the user 302 is successful, then at circle 1, a session 322 may be established for the user 302 at the first data center 320. The security data 324 associated with the user 302 may be updated to include an identifier of the data center at which the session 322 is established (e.g., "DC1" as an identifier for the first data center 320).

The security data 324 associated with the user 302 may be provided to other data centers in the multi data center deployment. For instance, at circle 2, the security data 324 associated with the user 302 may be provided to the second data center 330 to be saved under security data 334 associated with the user 302. At circle 3, the security data 324 may be provided to the Nth data center 340 to be saved under security data 344 associated with the user 302. Thus, each data center will have security data associated with the user 302 that includes the identifier (e.g., "DC1") for the first data center 320 since the session 322 for the user 302 is established at the first data center 320.

At circle 4, once the session 322 is established for the user 302 at the first data center 320, the user 302 may be able to use the client device 304 to access the requested resource of the resource management system 350 using the established session 322. While the session 322 for the user 302 is still active, no other sessions associated with the user 302 can be established.

For instance, at circle 5, a user 312 may direct a client device 314 or an application 316 of client device 314 to request access to a protected resource, and that request may be handled by the second data center 330 (e.g., if the client device 314 is closer to the second data center 330 than to the first data center 320). In some cases, the user 312 may be the same person as the user 302, but in most cases, the user 312 will be a different person from the user 302. If the user 312 provides the same user credentials that the user 302 supplied for authentication/authorization purposes (e.g., trying to pass off as the user 302), then the second data center 330 will look at the security data 334 associated with the user 302 which includes the identifier for the first data center 320. This will signify to the second data center 330 that a session for the user 302 (e.g., session 322) has been established by the first data center 320 and is currently active. If the authorization policy prevents any more than a single session for the user 302, then in order to preserve the allowed maximum session count for the user 302, the access management system as the second data center 330 will not create another session for the user 312 to use with the client device 314. Accordingly, the client device 314 will be not be given access to any of the resources hosted by the resource management system 350 (in the figure, this is shown by the "X" between the client device 314 and the resource management system 350).

Figure 4:
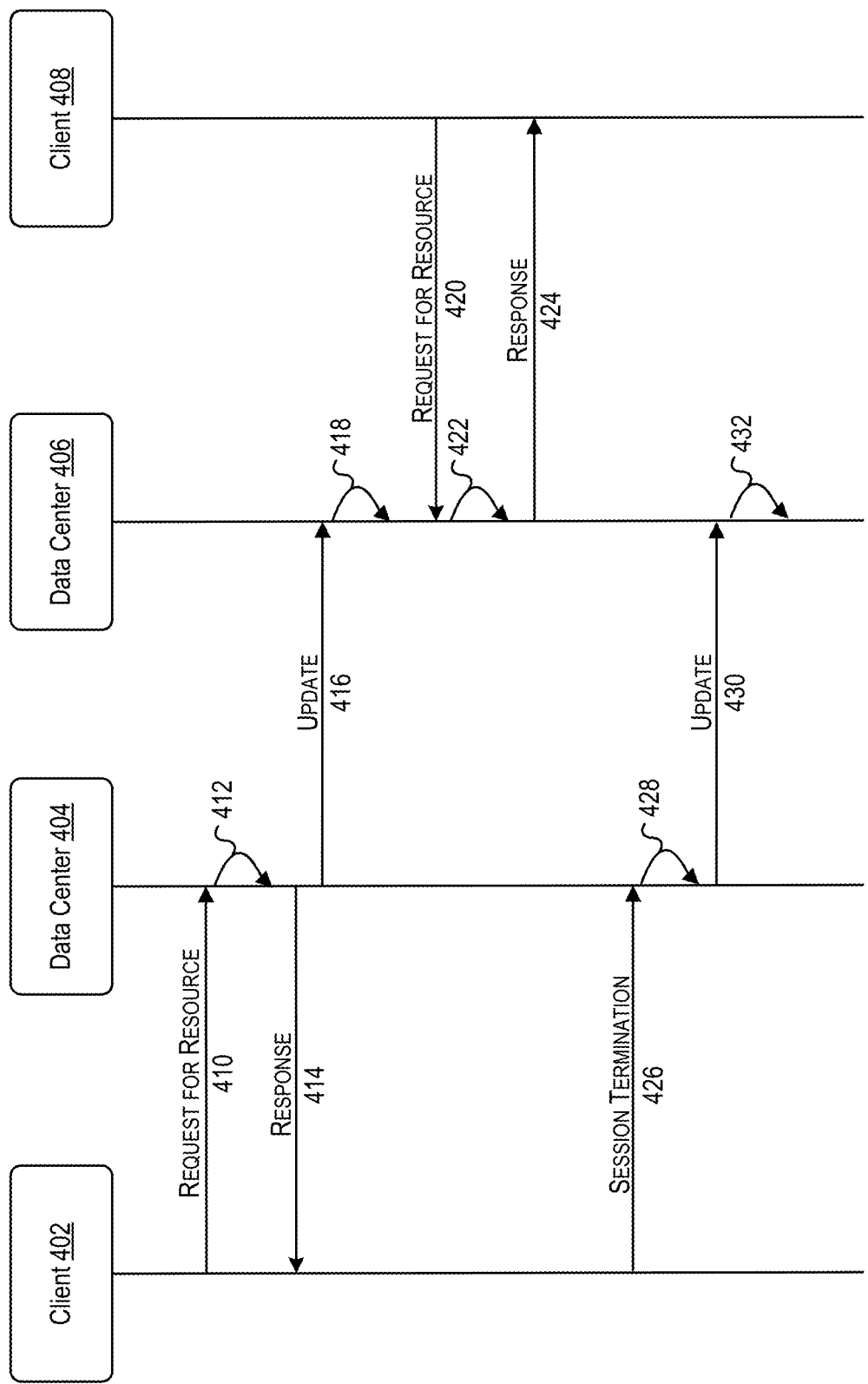
FIG. 4 illustrates a sequence diagram for enforcing a single user session across multiple data centers, in accordance with an embodiment of the present disclosure.

FIG. 4 illustrates a sequence diagram for enforcing a single user session across multiple data centers, in accordance with an embodiment of the present disclosure. For the purpose of facilitating understanding, a client in FIG. 4 is a device; however, a client can be a device or an application on a device.

A first user may operate a first client 410 to establish a session for access to one or more protected resources. At step 410, the first client 410 may request access to the resource for the first user and send that request to an access management system at a first data center 404.

At step 412, the access management system of data center 404 may determine whether the first user was previously authenticated for access at the client 410. If access is managed according to techniques for SSO, then the access management system may determine whether the user was authenticated at any client. The access management system may communicate with the client 402 to request and obtain credentials to authenticate the user. Upon successful authentication of the first user, the access management system of the data center 404 may create a session for the user. As part of creating the session, the access management system 140 may update security data associated with the user, which may include a "lockedBy" attribute. In some cases, the access management system may update the security data associated with the user by changing the value of the "lockedBy" attribute to an identifier of the data center 404. In some embodiments, the security data may be associated with the session data for the first user, which may include information such as the IP Address of the client 402, the authentication level, the authentication scheme, the authentication timestamp, and the application domain information for accessed resources. The session data may also include specific attributes, such as access timestamp, partner information of a last accessed resource, and application domain information for one or more accessed resources, and this data may be updated each time the first user requests access.

After the session is created, at step 414, the access management system of the data center 404 may send a response to the client 402. The response may include a portion of the session information, which the client 402 can use to access or log in to the session. In some cases, the response may be pre-defined. In some embodiments, the signed access claim may include an identity store identifier and/or a domain name (DN) identifier of the authenticated user so the access management system can retrieve session data or security data when needed.

After the session is created, at step 416, the data center 404 may send an update to data center 406, as well as any other data centers in the multi data center deployment. The update provided to data center 406 may include the updated security data, which should now include the identifier of the data center 404.

At step 418, the access management system of the data center 406 will receive the security data associated with the first user, and the access management system of the data center 406 will update the security data within the data center 406 with the received security data associated with the first user. For instance, since the received security data includes the identifier of the data center 404, the security data for the user at the data center 406 can be updated to also include the identifier of the data center 404.

At step 420, while the session for the first user is still active (and the security data associated with the user includes the identifier of the data center 404), a second user may operate a second client 408 to establish a session for access to one or more protected resources. The second client 408 may request access to the resource for the second user and send that request to an access management system at the second data center 406.

At step 422, the access management system of the second data center 406 may determine whether the second user was previously authenticated for access at the client 408. If access is managed according to techniques for SSO, then the access management system may determine whether the user was authenticated at any client. The access management system may communicate with the client 408 to request and obtain credentials to authenticate the user. In some cases, the second user may provide the user credentials of the first user, in which case the access management system of the second data center 406 will attempt to authenticate the credentials of the first user. The access management system of the second data center 406 may also check to see if a session is active and already exists for the first user (since the credentials of the first user are being used for authentication). The access management system may determine that a session exists for the first user if the security data associated with the first user includes an identifier of a data center within the multi data center deployment (e.g., the identifier of the first data center 404).

If no session exists for the user associated with the user credentials supplied by the client 408 (e.g., the first user), then the access management system of the data center 406 may create and establish a session for the client 408. The security data associated with that user would be updated within data center 406. For instance, if the security data includes a "lockedBy" attribute, the value of the "lockedBy" attribute would be changed to an identifier of the data center 406 in order to signify that the data center 406 established the session. However, if a session exists, then the access management system of the data center 406 would deny the creation of a session for the client 408.

At step 424, the access management system of the data center 406 may send a response back to the client 408. If a session for client 408 was created at step 422, then the response may include a portion of the session information for the client 408 to use. If no session was created at step 422, then the response may notify the client 408 that no session was created and access to the resource requested (at step 420) is denied.

If the session for client 402 (that was created at step 412) is still active, it may remain active until the session is terminated. In some cases, the client 402 may voluntarily initiate termination of the session (e.g., if the user logs out of the session), in which case, at step 426, the client 402 will send a session termination to the data center 404. However, in some embodiments, a session may be terminated without action taken by the client 402 (and thus, without step 426). For instance, the access management system may be configured with an expiry time or maximum lifetime for a session (e.g., 4 hours), such that any session that exists for longer than the expiry time is automatically terminated. Or the access management system may have a configurable idle timeout period (e.g., 15 minutes or 1 hour), such that any session that is idle for longer than the idle period will be automatically terminated.

At step 428, the access management system of the data center 404 will terminate the session. This may include revising the security data associated with the first user (e.g., the user of the client 402), such that the security data no longer includes the value of the identifier of the data center 404.

At step 430, the data center 404 may send an update to data center 406, as well as any other data centers in the multi data center deployment. The update provided to data center 406 may notify that the session associated with the first user has been terminated, or a notification to clear out the security data associated with the first user at data center 406 (e.g., by deleting the identifier of the data center 404 in the security data). Or, the update itself may include the revised security data, which may no longer have the value of the identifier of the data center 404.

At step 432, the data center 406 can update its own security data (associated with the first user) based on the notification or received revised security data (e.g., to delete the identifier of the data center 404 or any identifier of other data centers).

Figure 5:
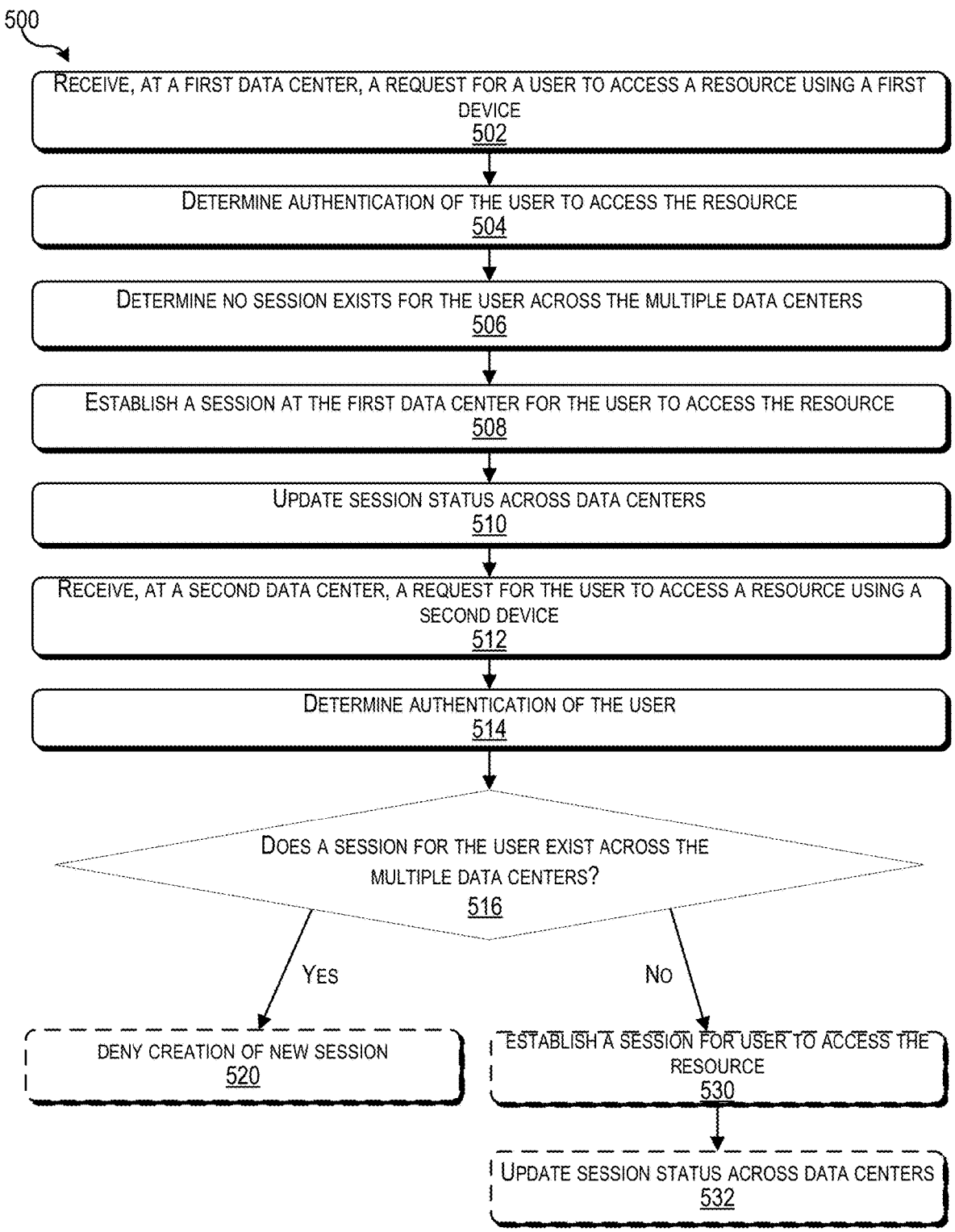
FIG. 5 illustrates a flow chart for enforcing a single user session across multiple data centers, in accordance with an embodiment of the present disclosure.

FIG. 5 illustrates a flow chart 500 for enforcing a single user session across multiple data centers, in accordance with an embodiment of the present disclosure. Flow chart 500 may be implemented by the access management systems of FIG. 1.

At step 502, a first data center will receive (e.g., from a first device) a request for a user to access a resource.

At step 504, the first data center will determine authentication and authorization of the user based on user credentials supplied by the user.

In some embodiments, authentication and authorization of the user may involve retrieving information (e.g., subject information) about the user from a data store of an access management system (e.g., implemented by the first data center). The information may include user identity information. The user identify information may include user access information such as a domain name of the user.

At step 506, if the user is successfully authenticated, the first data center will determine if there is no existing session associated with that user. In some embodiments, the first data center may check a data store in the first data center for security data associated with the user. If the security data for the user is blank or does not specify an identifier for a data center, then no session exists for the user. However, if the security data includes an identifier for a data center, that means a session exists for the user.

At step 508, if there is no session for the user, then the first data center will establish a session for the user to access the requested resource. The relevant session information will be provided to the user (e.g., to the first device) so that the user can access the resource through the first device.

At step 510, since a new session was established for the user, the session status has to be updated across all the data centers of the multi data center deployment. At the first data center, the security data associated with the user can be changed to include an identifier for the first data center (to signify that a session has been established by the first data center). This identifier for the first data center can be sent (e.g., as part of the security data associated with the user) to all the other data centers in the multi data center deployment for those other data centers to include in their security data for the user.

At step 512, a second data center will receive (e.g., from a second device) a request for the user to access a resource.

At step 514, the second data center will determine authentication and authorization of the user based on user credentials supplied by the user of the second device.

At step 516, if the user is successfully authenticated, the second data center will determine if there is an existing session associated with the user. In some embodiments, the second data center may check a data store in the second data center for security data associated with the user. If the security data for the user is blank or does not specify an identifier for a data center, then no session exists for the user. However, if the security data includes an identifier for a data center, that means a session exists for the user.

If a session exists for the user, then at step 520, the second data center will deny the creation of a new session for the user and the user will not be granted access to the resource through the second device.

If a session does not exist for the user, then at step 530, the second data center will establish a new session for the user to access the resource using the second device.

At step 532, since a new session was established for the user, this session status has to be updated across all the data centers of the multi data center deployment. At the second data center, the security data associated with the user can be changed to include an identifier for the second data center (to signify that a session has been established by the second data center). This identifier for the second data center can be sent (e.g., as part of the security data associated with the user) to all the other data centers in the multi data center deployment for those other data centers to include in their security data for the user.

Figure 6:
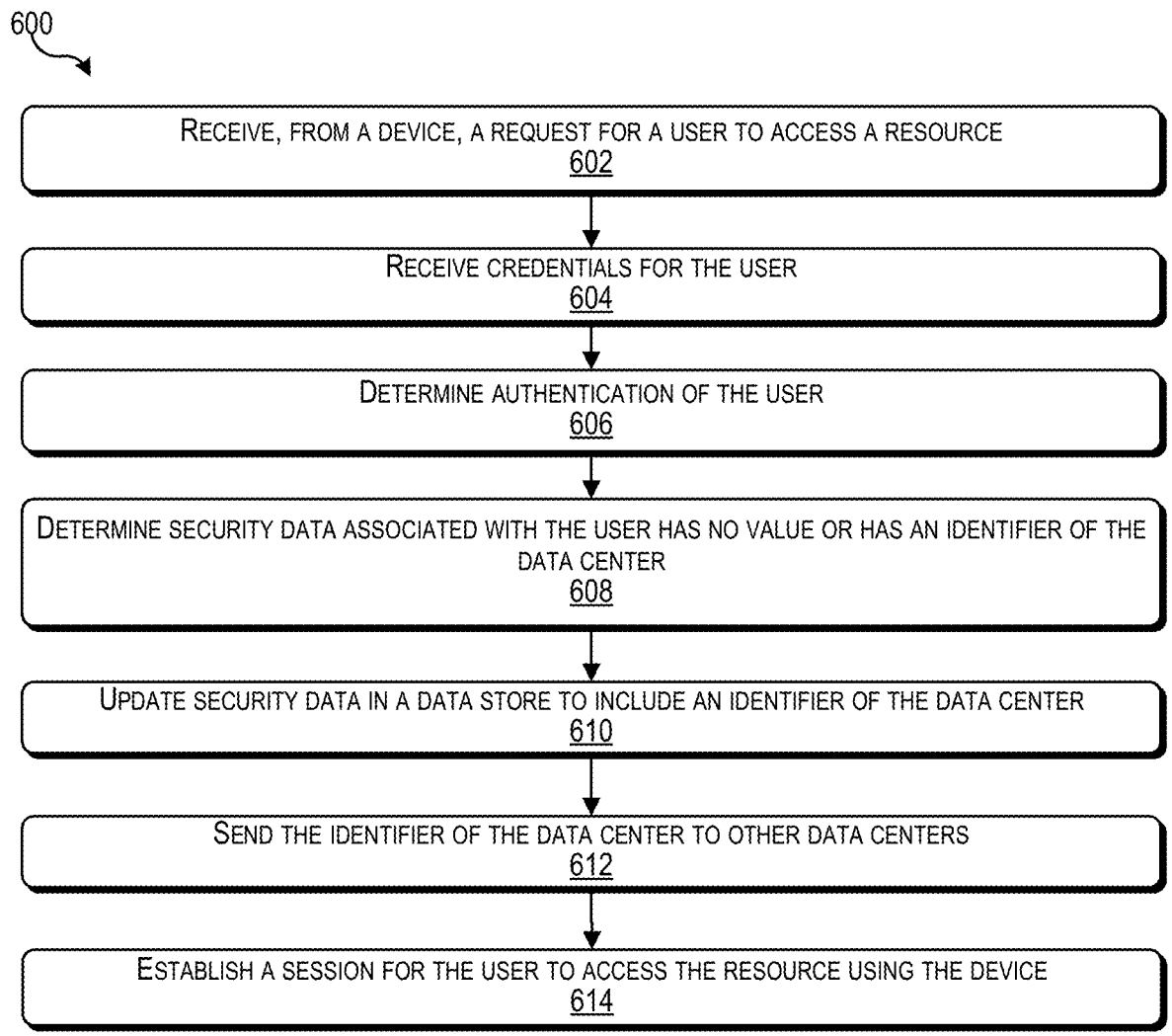
FIG. 6 illustrates a flow chart for enforcing a single user session at a first data center, in accordance with an embodiment of the present disclosure.

FIG. 6 illustrates a flow chart 600 for enforcing a single user session at a first data center, in accordance with an embodiment of the present disclosure. Flow chart 600 may be implemented by one of the access management systems (e.g., access management system 140) of FIG. 1.

At step 602, the data center will receive (e.g., from a client device) a request for a user to access a resource.

At step 604, the data center will receive credentials for the user (e.g., the user will supply credentials by entering them into the client device, which will send the credentials to the data center).

At step 606, the data center will determine authentication and authorization of the user based on user credentials supplied by the user.

At step 608, once the user is successfully authenticated, the data center will check security data associated with the user (located in a data store of the data center) and determine that it has no value (e.g., it does not include an identifier for a data center). This means that there is no existing session associated with the user.

At step 610, if there is no existing session for the user, then the data center will be free to establish a new session for the user to access the requested resource. The data center will change the security data associated with the user (in the data store) to include an identifier for the data center (to signify that a session has been established by the data center).

At step 612, this identifier for the data center can be sent (e.g., as part of the security data associated with the user) to all the other data centers in the multi data center deployment for those other data centers to include in their security data for the user.

At step 614, the data center will establish the new session for the user to access the requested resource. The relevant session information will be provided by the data center to the user (e.g., to the client device) so that the user can access the resource through the client device by logging on to the session. In some embodiments, the session information may be sent as a token.

Figure 7:
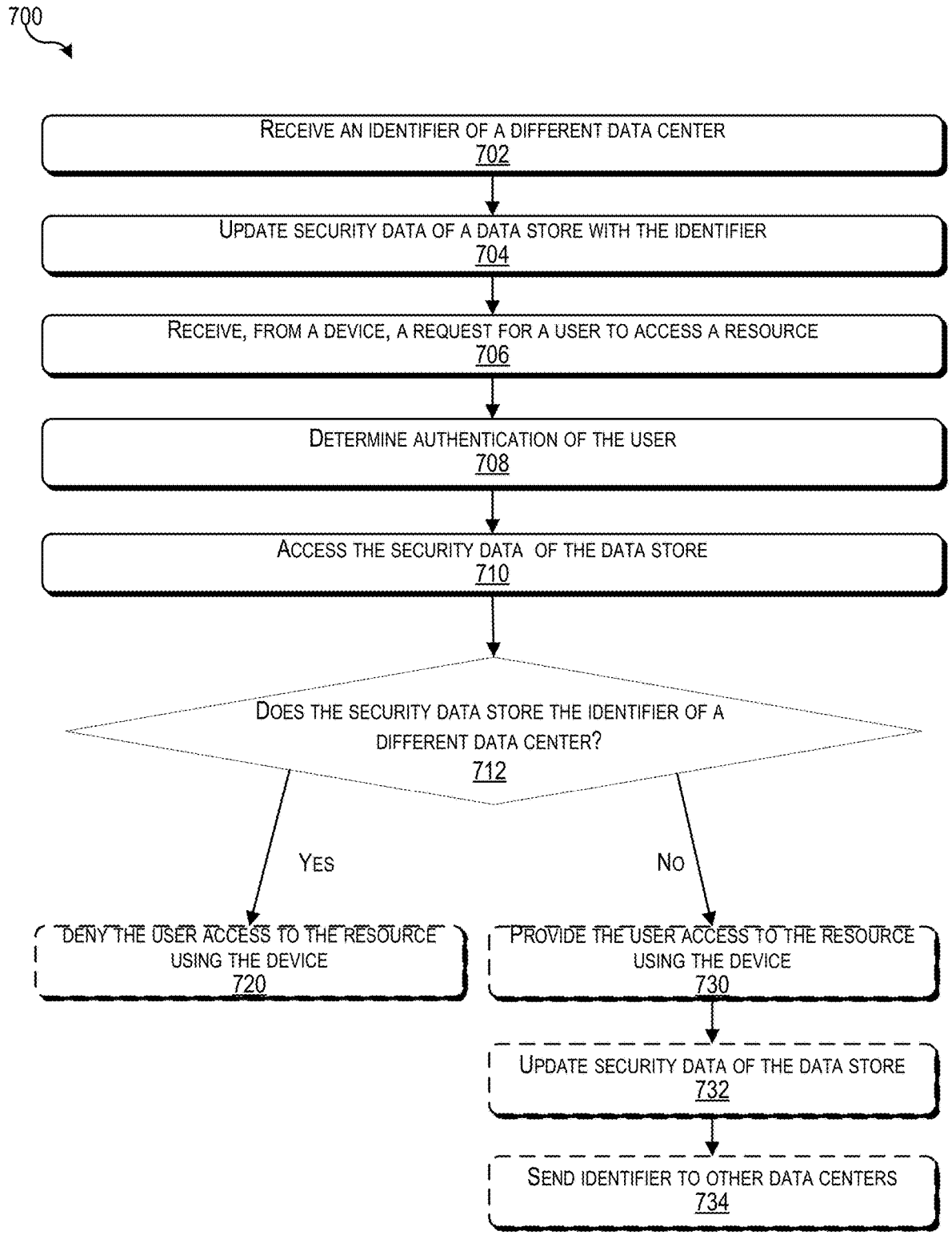
FIG. 7 illustrates a flow chart for enforcing a single user session at a second data center, in accordance with an embodiment of the present disclosure.

FIG. 7 illustrates a flow chart 700 for enforcing a single user session at a second data center, in accordance with an embodiment of the present disclosure. Flow chart 700 may be implemented by one of the access management systems (e.g., access management system 170) of FIG. 1.

At step 702, a data center will receive an identifier of a different data center in the same multi data center deployment. This identifier may be received alongside an indication of a user identity.

At step 704, the data center may update a data store containing security data associated with the user identity. The data center may locate the relevant security data for the user identity based on the received indication of the user identity. That security data can be updated to include the identifier of the different data center.

At step 706, the data center will receive (e.g., from a client device) a request for the user to access a resource.

At step 708, the data center will determine authentication and authorization of the user based on user credentials supplied by the user of the client device.

At step 710, if the user is successfully authenticated, the data center will access the security data associated with the user in the data store.

At step 712, the data center will determine whether the security data associated with the user stores the identifier of a different data center in the multi data center deployment.

At step 720, if the identifier is present in the security data associated with the user, the data center will deny the user access to the resource using the device.

Alternatively, if the identifier is not present in the security data associated with the user, then at step 730 the data center will provide the user access to the resource using the device by establishing a session for the user and sending the session information to the user.

At step 732, since a new session was established for the user, the data center will update the security data associated with the user to include an identifier of the data center (to signify that a session has been established by the data center).

At step 7324, the identifier will be sent out to all the other data centers in the multi data center deployment for those other data centers to include in their security data for the user.

Figure 8:
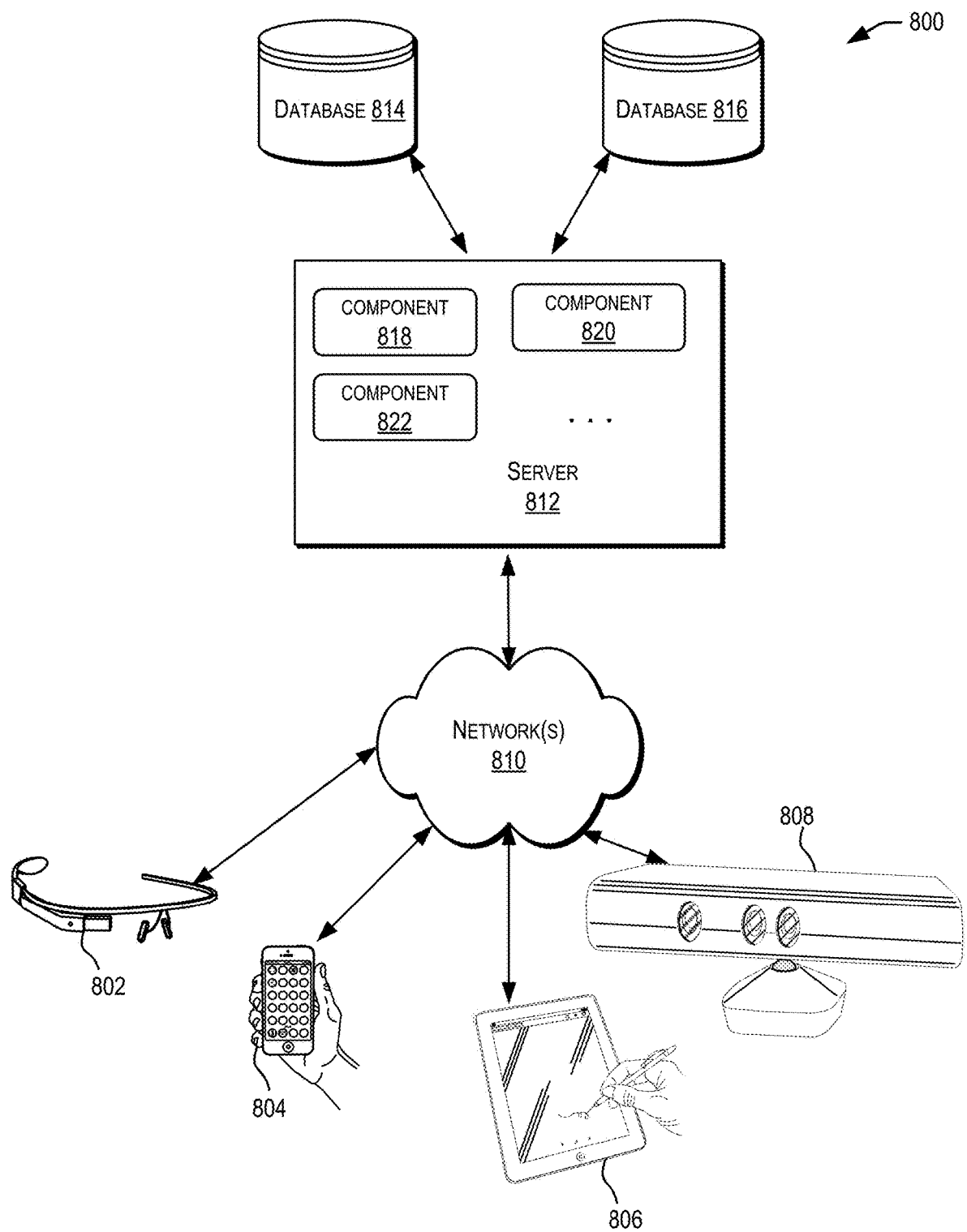
FIG. 8 depicts a simplified diagram of a distributed system for implementing an embodiment.

FIG. 8 depicts a simplified diagram of a distributed system 800 for implementing an embodiment. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications. In certain embodiments, server 812 may also provide other services or software applications can include non-virtual and virtual environments. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

Client computing devices 802, 804, 806, and/or 808 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810.

Although distributed system 800 in FIG. 8 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing as described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. These databases may provide a mechanism for storing information such as user interactions information, usage patterns information, adaptation rules information, and other information used by embodiments of the present disclosure. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle that are adapted to store, update, and retrieve data in response to SQL-formatted commands.

Figure 9:
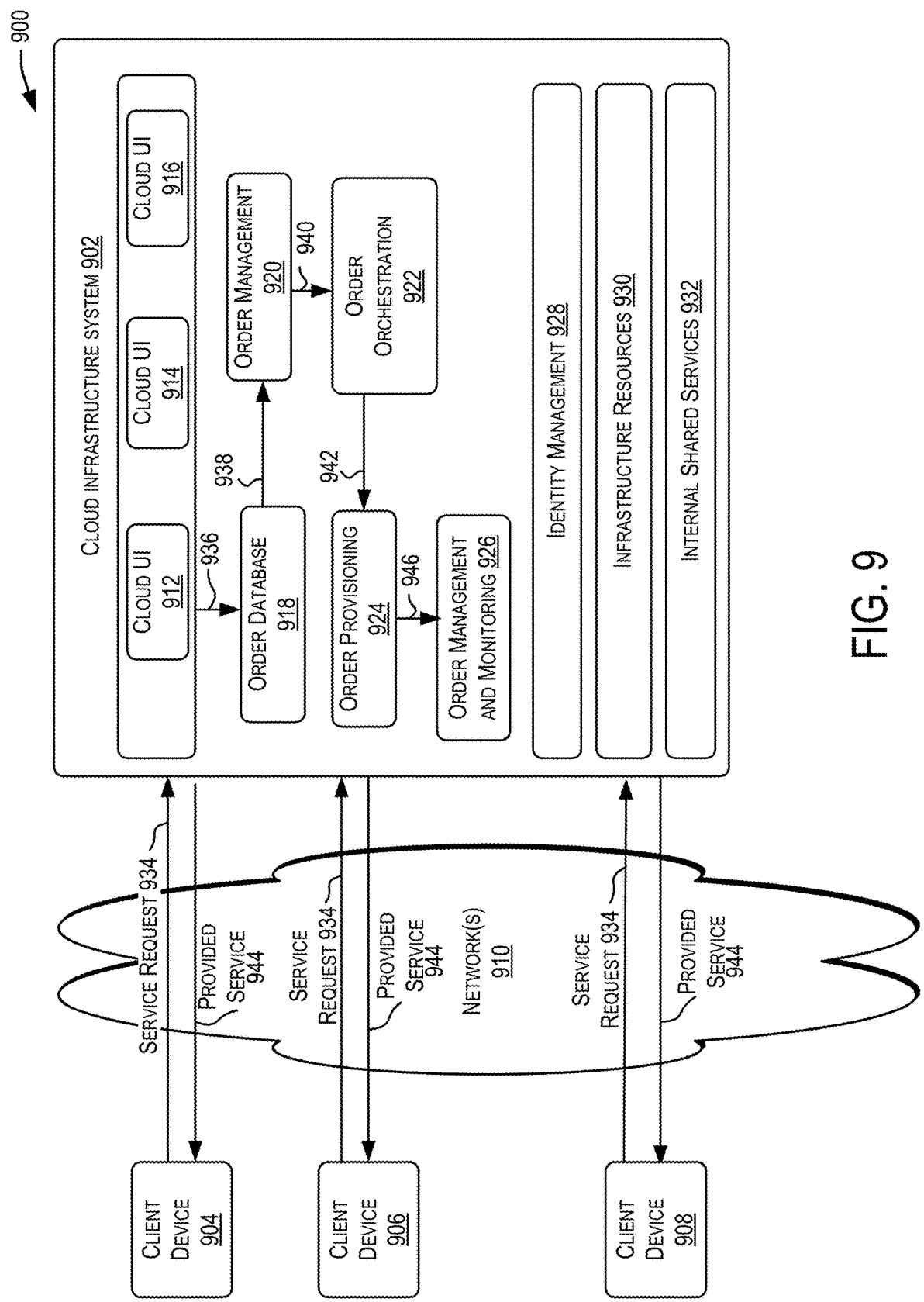
FIG. 9 illustrates a simplified block diagram of one or more components of a system environment in which services may be offered as cloud services, in accordance with an embodiment of the present disclosure.

In some embodiments, a cloud environment may provide one or more services. FIG. 9 is a simplified block diagram of one or more components of a system environment 900 in which services may be offered as cloud services, in accordance with an embodiment of the present disclosure. In the illustrated embodiment in FIG. 9, system environment 900 includes one or more client computing devices 904, 906, and 908 that may be used by users to interact with a cloud infrastructure system 902 that provides cloud services. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the disclosure. In some other embodiments, cloud infrastructure system 902 may have more or fewer components than shown in the figure, may combine two or more components, or may have a different configuration or arrangement of components.

Client computing devices 904, 906, and 908 may be devices similar to those described above for client computing devices 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between client computing devices 904, 906, and 908 and cloud infrastructure system 902. Each network may be any type of network familiar to those skilled in the art that can support data communications using any of a variety of commercially-available protocols, including those described above for network(s) 810.

In certain embodiments, services provided by cloud infrastructure system 902 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at step 934, a customer using a client device, such as client computing devices 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At step 936, the order information received from the customer may be stored in an order database 918. If this is a new order, a new record may be created for the order. In one embodiment, order database 918 can be one of several databases operated by cloud infrastructure system 918 and operated in conjunction with other system elements.

At step 938, the order information may be forwarded to an order management module 920 that may be configured to perform billing and accounting functions related to the order, such as verifying the order, and upon verification, booking the order.

At step 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at step 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 922 to be isolated from implementation details, such as whether or not services and resources are actually provisioned on the fly or pre-provisioned and only allocated/assigned upon request.

At step 944, once the services and resources are provisioned, a notification may be sent to the subscribing customers indicating that the requested service is now ready for use. In some instance, information (e.g. a link) may be sent to the customer that enables the customer to start using the requested services.

At step 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
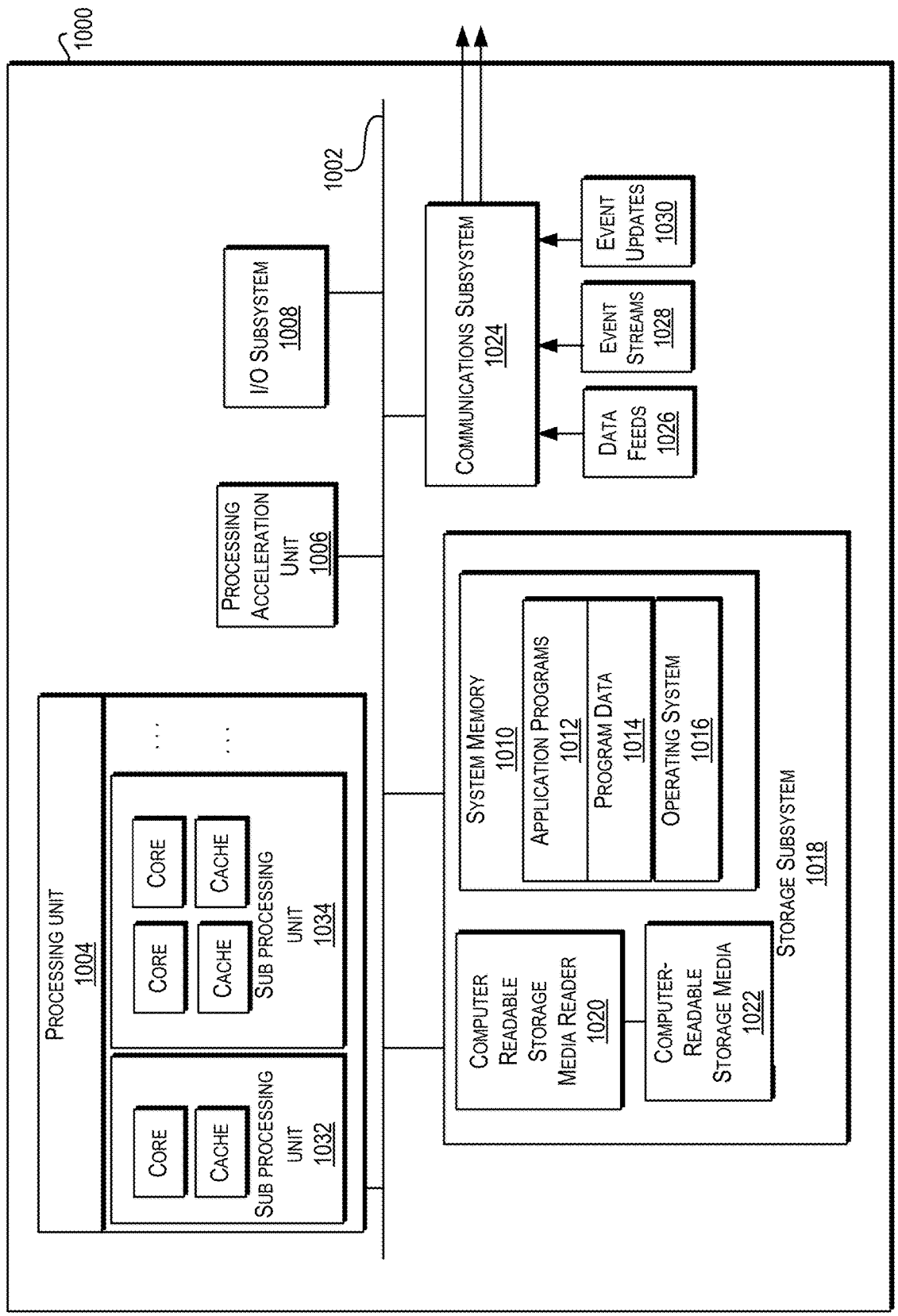
FIG. 10 illustrates an exemplary computer system that may be used to implement an embodiment of the present disclosure.

FIG. 10 illustrates an exemplary computer system 1000 that may be used to implement an embodiment of the present disclosure. In some embodiments, computer system 1000 may be used to implement any of the various servers and computer systems described above. As shown in FIG. 10, computer system 1000 includes various subsystems including a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities disclosed herein.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions), that when executed by processing subsystem 1004 causes a processor to provide the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client computing devices via the Internet for receiving and sending information from and to the client computing devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure.

Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
receiving, by a computer system of a first data center included in a first access management system, from a second data center of a second access management system, security data for a first user, wherein the security data includes: (i) an identifier of the second data center at which a session has been established for the first user to access a first resource using a first device, and (ii) a user credential of the first user;
storing, by the computer system of the first data center, the security data in a first data store in the first data center;
receiving, by the computer system of the first data center, the user credential and a request from a second user to access a second resource using a second device while the session for the first user is still active, wherein the second user is different from the first user and the second device is different from the first device;
determining, by the computer system of the first data center, the second user is authenticated to access the second resource using the second device based on the user credential;
in response to determining the the second user is authenticated to access the second resource using the second device, determining, by the computer system of the first data center, there is an existing session associated with the user credential provided by the second user, wherein the determining there is the existing session comprises: identifying the security data for the first user in the first data store based on the user credential, and determining there is the existing session associated with the user credential based on a presence of the identifier of the second data center within the security data; and
based on determining that there is the existing session associated with the user credential provided by the second user, denying, by the computer system of the first data center, the second user to access the second resource using the second device.

2. The method of claim 1, wherein the method further comprises:
receiving, by the computer system of the first data center, from the second data center of the second access management system, a notification that the second data center has terminated the session for the first user to access the first resource using the first device; and
upon receiving the notification, removing, by the computer system of the first data center, the identifier of the second data center from the security data in the first data store in the first data center.

3. The method of claim 1, wherein the first data center and the second data center are part of a multi data center deployment.

4. The method of claim 1, wherein the authentication of the second user is based on checking the user credential against a user identity in an identity store of the first data center.

5. A system comprising:
a first data center of a first access management system, the first data center including a first processor and a first memory storing a first set of instructions that, upon execution by the first processor, cause the first processor to:
determine an authentication of a first user to access a first resource using a first device;
in response to determining the authentication of the first user to access the first resource using the first device, determine whether there is an existing session associated with the first user, wherein the determining whether there is the existing session comprises: identifying security data for the first user based on the user credential, and determining whether the security data stores an identifier of the first data center or a second data center;
based on determining that there is no existing session associated with the first user, update the security data in the first data store to include the identifier of the first data center;
send the security data of the first user to the second data center, wherein the security data includes (i) the identifier of the first data center, and (ii) the user credential of the first user; and
establish a session at the first data center to enable the first user to access the first resource using the first device; and
the second data center of a second access management system, the second data center including a second processor and a second memory storing a second set of instructions that, upon execution by the second processor, cause the second processor to:
receive, from the first data center, the security data of the first user;
update a second data store in the second data center to include the security data of the first user;
receive the user credential and a request from a second user to access a second resource using a second device while the session for the first user is still active, wherein the second user is different from the first user and the second device is different from the first device;
determine the second user is authenticated to access the second resource using the second device based on the user credential;
in response to determining the the second user is authenticated to access the second resource using the second device, determining, by the computer system of the first data center, there is an existing session associated with the user credential provided by the second user, wherein the determining there is the existing session comprises: identifying the security data for the first user in the first data store based on the user credential, and determining there is the existing session associated with the user credential based on a presence of the identifier of the second data center within the security data; and
based on determining that there is the existing session associated with the user credential provided by the second user, denying the second user to access the second resource using the second device.

6. The system of claim 5, wherein the first data center and the second data center are part of a multi data center deployment.

7. The system of claim 5, wherein the identifier of the first data center is a ClusterID of the first data center.

8. The system of claim 5, wherein the authentication of the first user to access the first resource using the first device is based on a user identity in the first data store.

9. The system of claim 5, wherein the authentication of the second user to access the second resource using the second device is based on a user identity in the second data store.

10. A computer-program product tangibly embodied in a non-transitory machine-readable storage medium, including instructions configured to cause one or more data processors of a remote cloud server to perform actions including:
receiving, by a computer system of a first data center included in a first access management system, from a second data center of a second access management system, security data for a first user, wherein the security data includes: (i) an identifier of the second data center at which a session has been established for the first user to access a first resource using a first device, and (ii) a user credential of the first user;
storing, by the computer system of the first data center, the security data in a first data store in the first data center;
receiving, by the computer system of the first data center, the user credential and a request from a second user to access a second resource using a second device while the session for the first user is still active, wherein the second user is different from the first user and the second device is different from the first device;
determining, by the computer system of the first data center, the second user is authenticated to access the second resource using the second device based on the user credential;
in response to determining the second user is authenticated to access the second resource using the second device, determining, by the computer system of the first data center, there is an existing session associated with the user credential provided by the second user, wherein the determining there is the existing session comprises: identifying the security data for the first user in the first data store based on the user credential, and determining there is the existing session associated with the user credential based on a presence of the identifier of the second data center within the security data; and
based on determining that there is the existing session associated with the user credential provided by the second user, denying, by the computer system of the first data center, the second user to access the second resource using the second device.

* * * * *

UNITED STATES PATENT AND TRADEMARK OFFICE
CERTIFICATE OF CORRECTION

| | |
|---|---|
| PATENT NO. | : 11,290,438 B2 |
| APPLICATION NO. | : 15/784029 |
| DATED | : March 29, 2022 |
| INVENTOR(S) | : Mathew et al. |

It is certified that error appears in the above-identified patent and that said Letters Patent is hereby corrected as shown below:

On the Title Page

On page 2, Column 2, item (56) under U.S. PATENT DOCUMENTS, Line 1, insert -- 9,887,978 B2 6/2018 Goel --, therefor.

In the Specification

In Column 2, Line 61, delete "to to" and insert -- to --, therefor.

In Column 7, Lines 40-54, delete "For example, a web gate may include an agent component and a server side component. Each resource is protected through an agent of the web gate. Each agent may be associated with a particular data center with which the resource is stored and/or managed. The associated data center for an agent may be referred to as the web gate agent's end point. The web gate agent may intercept user requests for one or more resources protected by it and check for user credentials in order to authenticate the user. The agent may then contact an access manager server to verify whether the resource is a protected resource that requires credentials for access. If the access manager indicates that the resource is not protected, the agent will grant access to the user. If the resource is protected, the agent will challenge the user for credentials." and insert the same in Column 7, Line 39, as the continuation of same paragraph.

In Column 8, Lines 5-10, delete "Authorization is the process of determining if a user has a right to access a requested resource. Authorization policies may be defined that specify the conditions under which a user or group of users has access to a resource. For example, an administrator may only authorize certain users within a group to access particular resources." and insert the same in Column 8, Line 4, as the continuation of same paragraph.

In Column 9, Line 32, delete "syncronizing" and insert -- synchronizing --, therefor.

In Column 14, Line 23, delete "thereof In" and insert -- thereof. In --, therefor.

Signed and Sealed this
Twenty-third Day of August, 2022

Katherine Kelly Vidal
*Director of the United States Patent and Trademark Office*

CERTIFICATE OF CORRECTION (continued)
U.S. Pat. No. 11,290,438 B2

In Column 15, Lines 32-37, delete "Device 114 may communicate with access management system 140 via communication network 130. Examples of communication networks may include a mobile network, a wireless network, a cellular network, a local area network (LAN), a wide area network (WAN), other wireless communication networks, or combinations thereof." and insert the same in Column 15, Line 31, as the continuation of same paragraph.

In Column 23, Lines 32-39, delete "The access flow may generate two types of browser tokens. A first token is an access management ID token (e.g., OAM_ID token), which serves the SSO requests that are being propagated over HTTP. A second token may be an authorization token (e.g., OAMAuthn Token) that may be used to service the SSO requests that are being propagated over OAP. The browser tokens may be stored as host cookies at device 104." and insert the same in Column 23, Line 31, as the continuation of same paragraph.

In Column 35, Line 16, delete "Web-based" and insert -- web-based --, therefor.

In Columns 43-44, Line 55-67 (Column 43) 1-3 (Column 44), delete "Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times." and insert the same in Column 43, Line 54, as the continuation of same paragraph.

In Column 41, Line 45, delete "applications, Web" and insert -- applications, web --, therefor.

In the Claims

In Column 44, Line 37, in Claim 1, delete "the the" and insert -- the --, therefor.

In Column 45, Line 51, in Claim 5, delete "the the" and insert -- the --, therefor.